US010373212B2

(12) United States Patent
Systrom et al.

(10) Patent No.: US 10,373,212 B2
(45) Date of Patent: *Aug. 6, 2019

(54) METHODS FOR LINKING IMAGES IN SOCIAL FEEDS TO BRANDED CONTENT

(71) Applicant: Facebook, Inc., Menlo Park, CA (US)

(72) Inventors: Kevin Systrom, Menlo Park, CA (US); Amy Cole, Menlo Park, CA (US)

(73) Assignee: FACEBOOK, INC., Menlo Park, CA (US)

( * ) Notice: Subject to any disclaimer, the term of this patent is extended or adjusted under 35 U.S.C. 154(b) by 1093 days.

This patent is subject to a terminal disclaimer.

(21) Appl. No.: 13/829,035

(22) Filed: Mar. 14, 2013

(65) Prior Publication Data

US 2014/0279068 A1 Sep. 18, 2014

(51) Int. Cl.

*G06Q 30/02* (2012.01)
*G06Q 50/00* (2012.01)

(52) U.S. Cl.

CPC ..... *G06Q 30/0277* (2013.01); *G06Q 30/0255* (2013.01); *G06Q 30/0269* (2013.01); *G06Q 50/01* (2013.01)

(58) Field of Classification Search

CPC ........................................ G06Q 30/0207–0277
See application file for complete search history.

(56) References Cited

U.S. PATENT DOCUMENTS 6,321,211 B1 11/2001 Dodd
7,117,168 B2 10/2006 Eaton
7,174,307 B2 2/2007 Sakai et al.
7,792,751 B2 9/2010 Tan
7,895,085 B2 2/2011 Karas et al.
7,945,653 B2 * 5/2011 Zuckerberg ....... G06F 17/30265 709/223
8,046,237 B1 * 10/2011 King ...................... G06Q 30/02 705/26.1
8,046,266 B1 10/2011 Geller et al.
8,296,291 B1 * 10/2012 Desjardins .................... 707/723
8,856,232 B1 * 10/2014 Swerdlow .............. G06Q 10/10 709/204
9,251,395 B1 * 2/2016 Botchen ............ G06F 17/30247

(Continued)

FOREIGN PATENT DOCUMENTS

WO WO2011/051937 * 5/2011 ............... G06F 3/00

OTHER PUBLICATIONS

User Interactions in Social Networks and their Implications; Wilson et al. UC Santa Barbara, Apr. 1-3, 2009, Eurosys '09.*

(Continued)

*Primary Examiner* — David J Stoltenberg
(74) *Attorney, Agent, or Firm* — Keller Jolley Preece

(57) ABSTRACT

One variation of a method for linking images in social feeds to branded content includes: loading an image to a social networking system; receiving, from a first user, a tag including identification of an item visible in a particular region of the image; associating the tag with the particular region of the image; based on the tag, correlating the item with a particular brand; posting the image to a social feed of the particular brand within the social networking system; and in response to interaction with the image, in the social feed, by a second user, directing the second user to brand content specified by the particular brand.

20 Claims, 14 Drawing Sheets

(56) References Cited

U.S. PATENT DOCUMENTS

2002/0026377 A1 2/2002 Takahashi
2008/0048023 A1 2/2008 Russell et al.
2009/0276459 A1* 11/2009 Trout .................... G06Q 30/02
2009/0324137 A1* 12/2009 Stallings et al. .............. 382/306
2010/0064007 A1* 3/2010 Randall ......................... 709/204
2010/0179874 A1* 7/2010 Higgins ............. G06K 9/00664 705/14.53
2010/0280921 A1 11/2010 Stone et al.
2010/0312724 A1 12/2010 Pinckney et al.
2010/0324985 A1 12/2010 Kumar et al.
2011/0016014 A1 1/2011 Tonnison et al.
2011/0022424 A1 1/2011 Vonderheide
2011/0082747 A1* 4/2011 Khan .................... G06Q 10/00 705/14.58
2011/0212717 A1* 9/2011 Rhoads ............. G06F 17/30241 455/420
2011/0258556 A1* 10/2011 Kiciman ................ G06Q 10/10 715/751
2011/0264528 A1 10/2011 Whale
2011/0307478 A1 12/2011 Pinckney et al.
2012/0016817 A1 1/2012 Smith et al.
2012/0022930 A1 1/2012 Brouhard
2012/0101897 A1* 4/2012 Vital, III ................ G06Q 30/02 705/14.49
2012/0150600 A1 6/2012 Isaacson et al.
2012/0150605 A1 6/2012 Isaacson et al.
2012/0197757 A1* 8/2012 Ajala ........................... 705/26.9
2012/0208592 A1* 8/2012 Davis .................... H04W 4/001 455/556.1
2012/0245987 A1 9/2012 Isaacson et al.
2012/0246184 A1* 9/2012 Rothschild ........ G06F 17/30047 707/758
2012/0278387 A1* 11/2012 Garcia ................... G06Q 50/01 709/204
2013/0027428 A1* 1/2013 Graham .................. H04L 51/32 345/633
2013/0060858 A1* 3/2013 Freishtat ................ G06Q 30/02 709/204
2013/0097186 A1* 4/2013 van Hoff ............... H04L 67/306 707/749
2013/0121571 A1* 5/2013 Gokturk ............ G06F 17/30259 382/165
2013/0191723 A1* 7/2013 Pappas ................ G06F 17/2247 715/234
2013/0198002 A1* 8/2013 Nuzzi ................ G06Q 30/0256 705/14.58
2013/0218968 A1* 8/2013 McEvilly et al. ............ 709/204
2013/0226711 A1* 8/2013 Wu et al. ................... 705/14.69
2013/0259297 A1* 10/2013 Knudson ....................... 382/103
2013/0290203 A1* 10/2013 Purves et al. ................. 705/319
2013/0304822 A1* 11/2013 Tetreault ....................... 709/204
2013/0332523 A1* 12/2013 Luu ............................... 709/204
2014/0022265 A1* 1/2014 Canan ....................... G06T 1/20 345/522
2014/0025735 A1* 1/2014 Garcia-Martinez et al. ................ 709/204
2014/0068450 A1* 3/2014 Wolfe ................. G06F 3/04842 715/738
2014/0074585 A1* 3/2014 Madsen ............. G06Q 30/0239 705/14.39
2014/0089142 A1* 3/2014 Jackovin .................... 705/26.61
2014/0089816 A1* 3/2014 DiPersia ............... G06F 3/0484 715/753
2014/0143247 A1* 5/2014 Rathnavelu ........ G06K 9/00288 707/737
2014/0244388 A1* 8/2014 Manouchehri ..... G06Q 30/0256 705/14.53
2014/0259113 A1* 9/2014 Harris ..................... H04L 51/14 726/4
2014/0279061 A1* 9/2014 Elimeliah et al. ......... 705/14.72
2014/0310079 A1* 10/2014 Girard .................... G06Q 30/00 705/14.16

OTHER PUBLICATIONS

An examination of social tagging interface features and functionalities an analytical comparison; Shiri, Ali; Online Information Review vol. 33 No. 5, 2009 pp. 901-919.*

* cited by examiner

METHODS FOR LINKING IMAGES IN SOCIAL FEEDS TO BRANDED CONTENT

CROSS-REFERENCE TO RELATED APPLICATIONS

This application is related to: U.S. Patent Application No. 61/849,813, filed on 31 Jan. 2013 and titled "METHODS FOR ENABLING GIFT CARD TRANSACTIONS"; U.S. patent application Ser. No. 12/890,283, filed 24 Sep. 2010 and titled "Auto Tagging in Geo-Social Networking System"; U.S. patent application Ser. No. 12/978,265, filed on 23 Dec. 2010 and titled "Contextually Relevant Affinity Prediction in a Social Networking System"; U.S. patent application Ser. No. 13/239,340, filed on 21 Sep. 2011 and titled "Structured Objects and Actions on a Social Networking System"; U.S. patent application Ser. No. 12/508,521, filed on 23 Jul. 2009 and titled "Markup Language for Incorporating Social Networking Information by an External Website"; U.S. Pat. No. 8,250,145, issued on 21 Aug. 2012 and titled "Personalizing a Web Page Outside of a Social Networking System with Content from the Social Networking System"; U.S. patent application Ser. No. 12/969,368, filed on 15 Dec. 2010 and titled "Comment Plug-In for Third Party System"; U.S. patent application Ser. No. 12/253,149, filed on 16 Oct. 2008 and titled "Resource Management of Social Network Application"; U.S. patent application Ser. No. 12/154,886, filed on 27 May 2008 and titled "Systems and methods for providing privacy settings for applications associated with a user profile"; and U.S. patent application Ser. No. 13/167,702, filed on 24 Jun. 2011 and titled "Suggesting Tags in Status Messages Based On Social Context", all of which are incorporated herein in their entirety by this reference.

TECHNICAL FIELD

This invention relates generally to the field of online advertising, and more specifically to a new and useful method for linking images in social feeds to branded content in the field of online advertising.

BACKGROUND

Billions of dollars are spent annually on online advertising in the United States alone with the hope that such marketing will influence viewers to purchase products. In fact, online advertising is a core source of income for many Internet-based companies, both large and small, and the anticipated or estimated effectiveness of these online advertisements in influencing viewers to transact with merchants is often cited as justification for such marketing. However, professional advertising campaigns are both expensive and not always representative of a fit, form, function, or use of an advertised product.

DESCRIPTION OF THE EMBODIMENTS

The following description of the embodiments of the invention is not intended to limit the invention to these embodiments, but rather to enable any person skilled in the art to make and use this invention.

1. First Method

Figure 1:
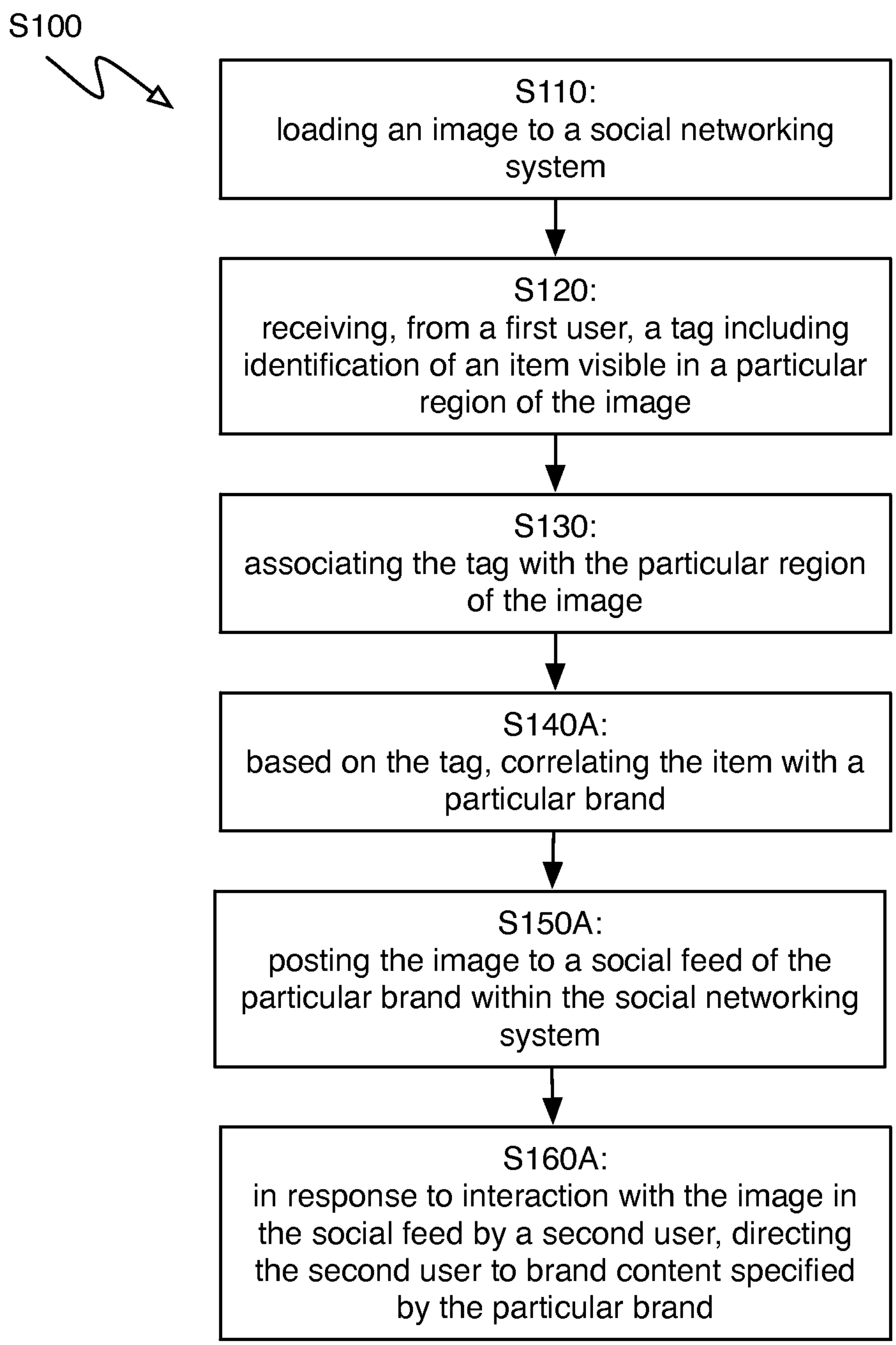
FIG. 1 is a flowchart representation of a first method of one embodiment.

As shown in FIG. 1, a first method S100 for linking images in social feeds to branded content includes: loading an image to a social networking system in Block S110; receiving, from a first user, a tag including identification of an item visible in a particular region of the image in Block S120; associating the tag with the particular region of the image in Block S130; based on the tag, correlating the item with a particular brand in Block S140A; posting the image to a social feed of the particular brand within the social networking system in Block S150A; and, in response to interaction with the image in the social feed by a second user, directing the second user to brand content specified by the particular brand in Block S160A.

Figure 2:
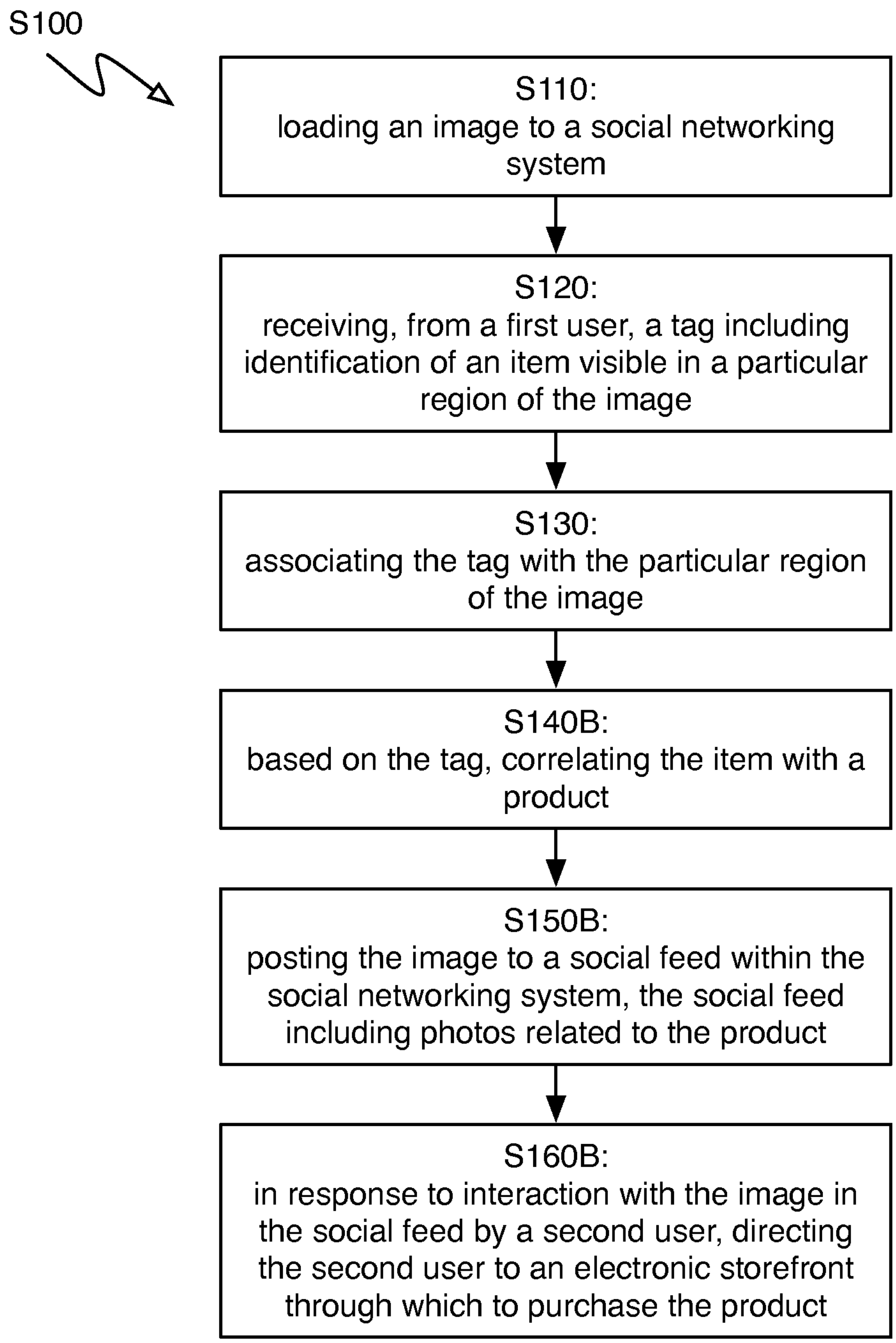
FIGS. 2 and 3 are flowchart representations of two variations of the first method.

As shown in FIG. 2, one variation of first method S100 includes: loading an image to a social networking system in Block S110; receiving, from a first user, a tag including identification of an item visible in a particular region of the image in Block S120; associating the tag with the particular region of the image in Block S130; based on the tag, correlating the item with a product in Block S140B; posting the image to a social feed within the social networking system in Block S150B, the social feed including photos related to the product; and, in response to interaction with the image in the social feed by a second user, directing the second user to an electronic storefront through which to purchase the product in Block S160B.

Figure 11:
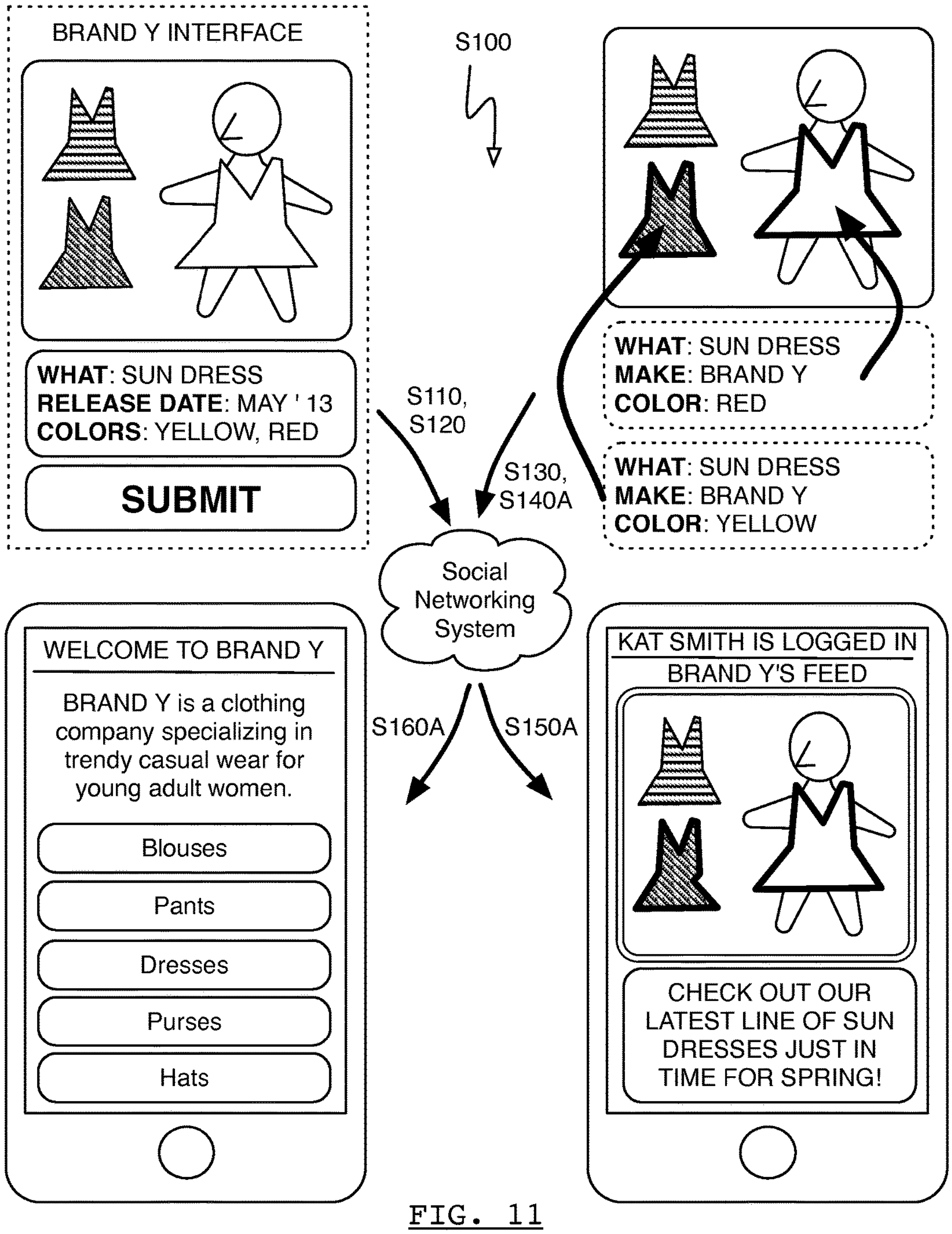
FIGS. 11 and 12 are flowchart representations of two variations of the first method.
Figure 12:
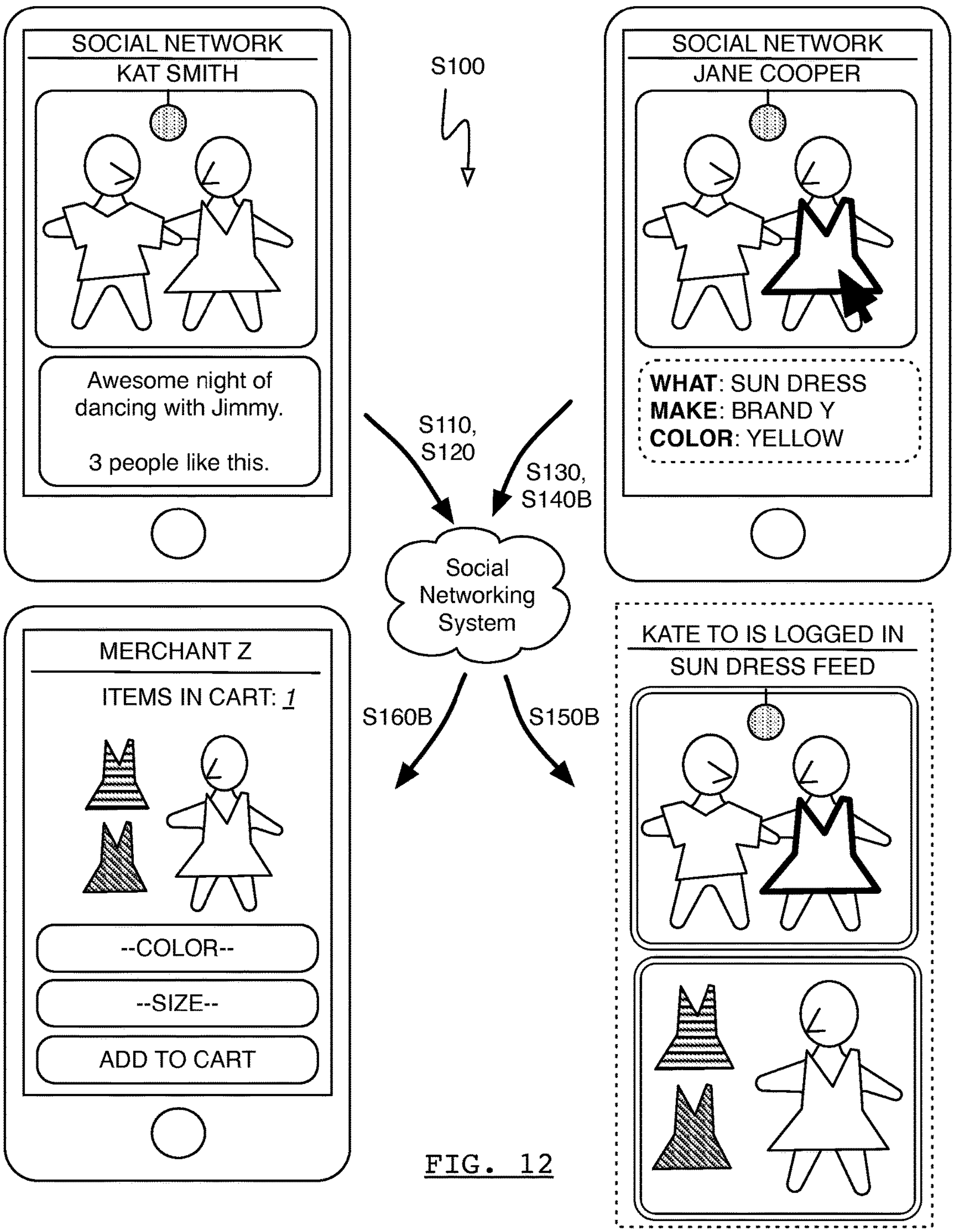

Generally, as shown in FIG. 11, first method S100 functions to tag an image in a social feed with brand-related metadata, to define a link (or "hotspot") within the image to brand content, and to direct a user (i.e., a second user) to brand content through the link in the image. Similarly, as shown in FIG. 12, the variation of first method S100 functions to tag an image in a social feed with product-related metadata, to define a link within the image to a product storefront, and to direct a user (i.e., a second user) to the product storefront through the link in the image. Therefore, first method S100 enables users to upload images to a social feed within a social networking system (e.g., Instagram, Facebook) and to incorporate links to brands or products within the image such that other users can access brand or product information directly through the image shown in a social (image-based) feed.

In one implementation, the image is a professional (i.e., official) advertisement image, such as uploaded by a merchant or brand as part of a marketing campaign for the merchant, the brand, the product, a product line, a store location, etc., as shown in FIG. 11. In this implementation, the image can assume the role of a visual advertisement while accommodating the form factor and visual 'language' of other images in the social feed, which may be amateur images, thereby avoiding substantial disruption to the flow of the social feed or to a user viewing experience within the social feed. For example, the image can include a professional image of a branded soda can by Brand X, wherein the whole image is tagged with Brand X and linked to a social feed of Brand X within the social networking system such that a user can click anywhere on the image to be directed to Brand X's social feed.

In another implementation, the image is an amateur (i.e., unofficial) image, such as a digital photograph captured with a smartphone and uploaded to the social networking system, by a user, though a native application executing on the smartphone, as shown in FIG. 12. In this implementation, once the image is uploaded to a social feed within the social networking system, the user, any other user, the brand, the merchant, etc. can add tags to the image, such as to specific regions of the image, wherein each tag can define a link to a product page, brand page, storefront, etc. through which another user can learn about a brand, purchase a product, etc. Therefore, in this implementation, the image can assume the role of an advertisement for a product, brand, merchant, etc. despite the origin of the image that is unaffiliated with the product, brand, merchant, etc. In one example, a first private user uploads the image that includes an amateur photograph of a woman on a beach wearing a bathing suit by Brand Y and holding a branded soda can by Brand X. In this example, a second private user tags a first portion of the photograph depicting the branded soda with Brand X, and a representative of Brand Y tags a second portion of the photograph depicting the swimsuit with an online store that sells Brand Y products. Furthermore, in this example, when a third user clicks on the first portion of the image, Block S160A can direct the third user to a social feed of Brand X within the social networking system, and, when the third user clicks on the second portion of the image, Block S160B can direct the third user to an online store in which the third user can order an identical or similar swimsuit. Generally, first method S100 enables private users and/or commercial entities to link regions of an image in a social feed to a new page, background page, application, applet, pop-up, or other interface or menu through which users can access additional brand and/or product information.

Furthermore, the image can include representations of any suitable type of product. In one example implementation, the image depicts a tangible good, such as a blouse, a pair of shoes, a vehicle, a chair, a rug, a watch, or a smartphone. In a similar example implementation, the image depicts an electronic good, such as a video game, an electronic currency, or loyalty points for an airline. In another example implementation, the image depicts a consumable good, such as a can of soda, a cupcake, a bottle of water, vegetables, or uncooked brown rice. In yet another example implementation, the image depicts a service, such as a massage, an airline, or a cable or Internet service. In a further example implementation, the image depicts a location, such as a tourist attraction, a restaurant, a city, a museum, or a school. In another example implementation, the image depicts an event, such as a sporting event or a party. However, the image can depict any other suitable product that can be identified and tagged in the image.

First method S100 can be implemented by a computer system, such as through an online photo-sharing platform or a social networking system that executes on the computer system and uploads photos to social feeds, displays the photos to various users, such as based on user subscriptions, "follows," or connections to other users within the platform or network, and enables advertising to users through tagged photos. The computer system can be a cloud-based computer (e.g., Amazon EC2), a mainframe computer system, a grid-computer system, or any other suitable computer system. As described above, the computer system can support photo sharing within a social feed, wherein at least one photo in the social feed functions as an electronic advertisement to link a user to additional brand, product, merchant, or store content. For example, the computer system can upload a photo and associated tags over a distributed network, such as over the Internet, and one or more processors throughout the distributed network can implement one or more Blocks of first method S100 to post the photo to the social feed and to direct a user from the photo to additional related content. The computer system can also incorporate a user interface, a product interface, a brand interface, etc. For example, the brand can access the brand interface to curate a brand feed within the platform, upload new photos, arrange or rank official branded photos, arrange or rank unofficial photos with related tags, etc. Similarly, a user can access the user interface to upload and tag a photo, review his social feed, access the brand's social feed, etc. The user, merchant, and/or brand interfaces can each be accessible through a web browser, through a native application executing on a computing device (e.g., a laptop computer, a desktop computer, a tablet, a smartphone, a personal data assistant (PDA), a personal music player, etc.), through enterprise management or sales software, etc., any of which can be internal or external the social networking system or photo-sharing platform. However, first method S100 can be implemented by any other computer system, service, network, etc. and can include any other interface to support advertising, data collection, data sharing, and data analysis.

Block S110 of first method S100 recites loading an image to a social networking system. The image can be a digital or electronic image that is static, such as a color, black-and-white, or sepia photograph, or dynamic, such as a video, meme, or other visual image. As described above, the image can be an "official" image, such as uploaded by a brand, merchant, store, or entity thereof as part of an advertising campaign, or the image can be an "unofficial" image, such as uploaded by a private user and tagged with various metadata by the private user and/or any other private user. In one implementation, Block S110 uploads the image from a standalone computing device, such as a desktop computer, a tablet, a smartphone, an Internet-capable camera, etc. In another implementation, Block S110 uploads the image from a local or remote server. For example, Block S110 can retrieve the image from any other Internet site by accessing the image through a server that supports the other Internet site.

Block S110 can also interface with an Internet-enabled digital camera, mobile device, desktop, or other computing device to automatically upload the image to the social networking system. For example Block S110 can implement privacy settings and automatic upload settings set by the user and associated with the user's social networking profile to automatically upload the image once captured by the user or automatically by the computing device. For example, the user can program an Internet-enabled digital camera to capture an image every minute for twenty-four hours, and Block S110 can automatically upload each image to the social networking system to generate a time-lapse image feed, including the image, within the social networking system.

Once the image is uploaded, Block S110 can post the image to a social feed within the social networking system (and/or photo-sharing platform). For example, a first user can capture a photographic image through a camera integrated into a smartphone and upload the photographic image to his social feed within the social networking system. Block S110 can thus post the photographic image to the first user's social feed. Block S110 can further share the photographic image across the social networking system, such as by posting the photographic image to one or more other social feeds, such as a social feed of another user who is a "friend" or otherwise connected to the first user in the social networking system. In this example, Block S150 can function to update previous postings of the photographic image and/or to post the photographic image to additional social feeds as new tags are added to the image. However, Block S110 can function in any other way to load the image to the social networking system (or photo-sharing platform).

Block S120 of first method S100 recites receiving, from a user, a tag including identification of an item visible in a particular region of the image. Generally, Block S120 functions to collect one or more tags from one or more users within the social networking system, wherein each tag is associated with at least one region of the image and specifies at least one product, brand, designer, store, merchant, model (i.e., person or product), manufacturer, etc. related to content within the respective region of the image. Block S120 can cooperate with Block S110 to load the image to the social networking system and receive a tag from a user, brand, etc. substantially simultaneously. For example, a private user can upload the image and add brand or product tags to the image through the same user interface. Additionally or alternatively, Block S120 can receive the tag substantially after the image is loaded to the social networking system and posted to a social feed. For example, a user or brand can retroactively add a tag to a previously-uploaded image, such as minutes, hours, days, or weeks after the image was first uploaded to the social networking system.

Block S120 can also receive multiple tags from one or more users or brands. For example, Block S110 can upload an amateur candid photograph, from a first user, to the first user's personal social feed within the social networking system, and Block S120 can receive a shoe brand tag, for a pair of shoes shown in the image, from the first user, a soda brand tag and a product tag for a soda can, shown in the image, from a second user, a vehicle manufacturer tag for a vehicle, shown in the image, from a third user, and a clothing item tag, for a clothing item shown in the image, from a fourth user. In another example, Block S110 can upload, from a handbag brand, an official marketing photograph of a woman holding a branded purse. In this example, Block S120 can receive a purse tag, for the purse shown in the image, from a representative of the brand at the time the image is uploaded, and Block S120 can subsequently receive a clothing brand tag, for a clothing item worn by the woman in the image, from one private user, as well as a shoe brand tag, for a pair of shoes worn by the woman in the image, from another private user.

Block S120 can further enable the image owner (i.e., the entity that uploaded the image, e.g., a user or a brand) to control which image tags are applied to an uploaded image. In one example implementation, Block S120 enables the image owner to approve, disapprove, or remove tags added by other users, brands, etc. For example, Block S120 can enable a clothing brand that uploaded an official image to disapprove or remove a tag for a clothing item by a competing clothing brand also visible in the image and to approve a tag for a handbag by a luggage brand that is not a direct competitor to the clothing brand. Block S120 can also enable the brand or user to correct a tag. For example, if a second user adds a Brand X tag for a shirt shown in the image when in fact the shirt is by Brand Y, Block S120 can enable the first user to correct the tag by replacing the Brand X tag with a Brand Y tag. However, Block S120 can enable a user, brand, etc. to adjust or modify image tags in any other way.

The tag received in Block S120 can include any one or more of a link or pointer to a brand, product, or merchant website outside of the social networking system or to a brand, product, or merchant social feed within the social networking system. Therefore, in this implementation, a user, brand, etc. can directly specify where or how another user is directed through the image. Alternatively, tag received in Block S120 can include a direct purchasing link (e.g., a "buy now" button) or a direct link or pointer to a payment platform through which to pay for the product. The tag received in Block S120 can also include a product or brand description, name, stock keeping unit (SKU) number, bar code, or other identifier of the product or brand. In this implementation, Block S120 can analyze the tag (e.g., key word extraction) to extract a brand or product identifier from the tag and then attach a link or pointer to a respective region of the image based on the identifier extracted from the tag.

In one implementation, Block S120 can receive the tag that specifies the entire image as a "hotspot" or link such that another user can click (e.g., with a mouse or finger on a touchscreen) anywhere on the image to be directed to a product review page, brand feed, online store, etc. within or outside the social networking system.

In another implementation, when receiving the tag, Block S120 can prompt the user, brand representative, etc. to select a particular region of the image on which to apply the tag, as shown in FIG. 12. For example, Block S120 can prompt the user to define the particular region of the image by selecting a circle of an appropriate size and then dragging the circle over a region of the image that includes a relevant product, brand, model, etc., wherein a region of the image within the circle defines a hotspot associated with the tag. Similarly, Block S120 can prompt the user to place a finger over the image to define a first corner of a rectangular area, to drag his finger across the image to adjust the width and height of the rectangular area, and to release his finger to set an opposite corner of the rectangular area, wherein a region of the image within the rectangular area defines a hotspot associated with the tag. In yet another example, Block S120 can prompt the user to use a finger, mouse, stylus, or other pointer to trace a border around a related product, brand, etc. In this implementation, Block S120 can receive multiple tags that define multiple overlapping or non-overlapping hotspots on the image. The hotspots can also be of the same, similar, or dissimilar shape or size. For example, for a branded image uploaded by a brand, a hotspot specified by a representative of the brand can cover a greater area of the image than a hotspot specified by another brand or a private user. In this example, method S100 can implement tagging rules, such as entered by the brand, to set hotspot regions or areas.

In yet another implementation, Block S120 can implement object recognition, character recognition, template matching, edge detection, and/or any other machine vision and/or machine learning technique to automatically identify a product or brand represented in the image. In one example, Block S120 analyzes images features, exchangeable image file format (exif) data of the image, location data, social context (e.g., user check-ins), and any other relevant image meta to generate the tag for the image. In another example, Block S120 receives a text-based descriptor of a product visible in the image, access a database of template images of a product based on the descriptor, and implement template matching to identify the product in the image. In this example, Block S120 can further set a hotspot in the image around the identified product.

In the foregoing implementation, Block S120 can implement an object image detection algorithm to identify a region of the image associated with a product, brand, designer, store, merchant, model, etc. Block S120 can then automatically generate the tag for the image or prompt the first user to enter or confirm the tag. For example, Block S120 can generate a set of potential tags for the image based on the object image detection algorithm, and the method can prompt the first user to select a preferred tag or a proper match for the image from the set of potential tags. Block S120 can also implement supervised or semi-supervised machine learning techniques, such as by augmenting a database of images with automatically-generated tags confirmed by users or images with manually-entered tags in order to improve the object image detection algorithm. For example, Block can add certain tagged image elements of the image to the object image detection algorithm, such as a blouse, skirt, shoes, handbag, sunglasses, etc. worn by a subject in the image. Alternatively, Block can add particular arrangements of various elements in images to the object image detection algorithm, such as arrangement of a bouquet of flowers within a vase or a belt over a pair of pants. Block S120 can therefore implement frequency domain image processing, filtering, wavelet analysis, feature extraction, learning-algorithms such as neural networks, texture recognition, or any other suitable machine vision or machine learning technique to automatically identify products, brands, models, etc. represented in the image and/or to automatically generate an image tag for an un-tagged or under-tagged image. Block S120 can further implement automatic tagging techniques described in U.S. patent application Ser. No. 12/890,283, filed 24 Sep. 2010, which is incorporated herein in its entirety by this reference.

Block S120 can further generate a suggestion for a brand to tag the image based on how fans or followers are interacting with the image. For example Block S120 can notify the brand that the image has been shared, commented on, and/or referenced more than average and thus push a suggestion to the brand to tag the image with additional content to maintain or augment a "viral" element of the image. However, Block S120 can function in any other way to receive a tag identifying an item visible in a region of the image.

Block S130 of first method S100 recites associating the tag with the particular region of the image. Generally, Block S130 functions to associate a tag received from a user, brand, etc. with all or a portion of the region to define a hotspot within the image. As described above, Block S130 can set multiple hotspots within a single image. Therefore, Block S130 can set one or more areas of the image through which a user can access additional brand, product, merchant, or product line information, access an online merchant or store through which to purchase a product or other brand products, etc.

Block S140A of first method S100 recites, based on the tag, correlating the item with a particular brand. Generally, Block S140A functions to associate the hotspot defined in the image through Blocks S120 and S130 with a particular brand to enable access to brand-related information through the hotspot. For example, by correlating the image with the brand, Block S140A can enable Block S150A to repost the image, with the hotspot(s), to a social feed of the brand within the social networking system. In another example, by correlating the image with the brand, Block S140A can enable Block S160A to direct a user from the hotspot to an external brand website or online store that sells products from the brand. Block S140A can also correlate the product in the image with a particular designer or a particular designer within the brand, thereby enabling Block S160A to direct a user from the hotspot to additional information about the designer or other products designed by the designer. Block S140A can therefore analyze tag information entered by a user, brand representative, etc. in Block S120 to identify a brand or related information pertinent to one or more regions of the image and to associate the identified brand or related information with one or more regions of the image. However, Block S140A can correlate an item (e.g., product) in the image with a particular brand in any other way.

Similarly, as shown in FIG. 2, Block S140B of one variation of first method S100 recites, based on the tag, correlating the item with a product. Generally, Block S140B functions to associate the hotspot defined in the image through Blocks S120 and S130 with a particular product to enable access to product-related information through the hotspot. For example, by correlating the image with the product, Block S140B can enable Block S150B to repost the image with the hotspot linking to a product page with other product-related images. In another example, by correlating the image with the product, Block S140B can enable Block S150A to direct a user from the hotspot to an external online store that sells the product. Block S140B can therefore analyze tag information entered by a user, brand representative, etc. in Block S120 to identify a product related to one or more regions of the image and to associate the identified product with one or more regions of the image. However, Block S140B can correlate a portion of the image with a product in any other way.

Figure 3:
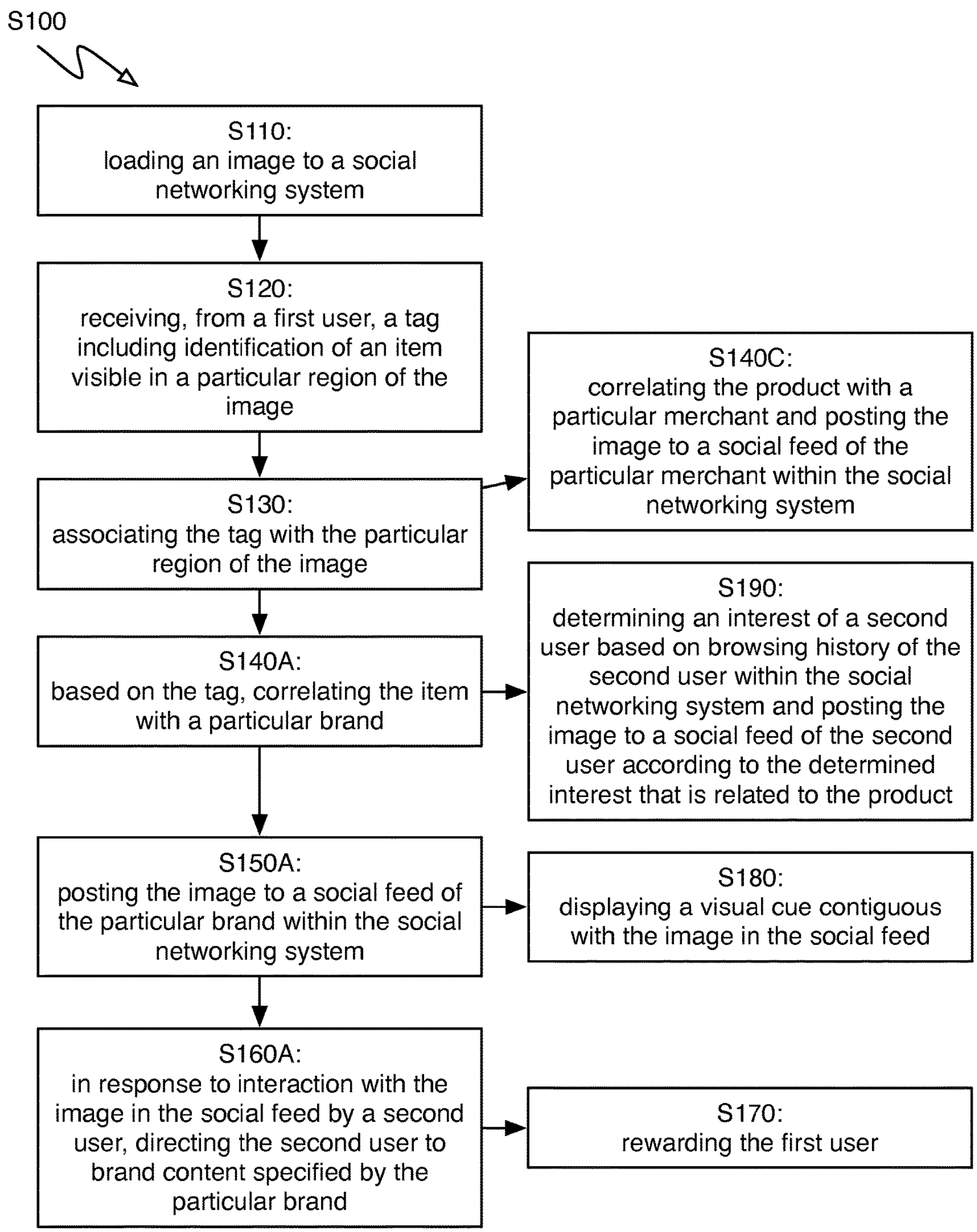

As shown in FIG. 3, one variation of first method S100 includes Block S140C, which recites correlating the product with a particular merchant and posting the image to a social feed of the particular merchant within the social networking system. Similar to Block S140A and Block S140B, Block S140C functions to associate the hotspot defined in the image through Blocks S120 and S130 with a particular merchant to enable access to merchant-related information through the hotspot. For example, by correlating the image with the merchant, Block S140C can enable Block S150B to repost the image, with the hotspot(s), to a social feed of a local brick-and-mortar merchant that offers the product for sale. In another example, by correlating the image with the product, Block S140C can enable Block S150B to direct a user from the hotspot to an external online storefront of the merchant, whereby the user may order the product. Block S140C can therefore analyze tag information entered by a user, brand representative, etc. in Block S120 to identify a merchant that sells the product identified or tagged in the image and to associate the merchant with the image. Block S140C can also select the merchant from a set of suitable online or brick-and-mortar stores based on a contract with the social networking system, a user's transaction history (e.g., has the user previously shopped with this merchant?), a user demographic (e.g., an adult-targeted store for a user who is an adult), a user location (e.g., GPS location data of a smartphone associated with the user and that is physically nearby a particular brick-and-mortar merchant), etc. For example, Block S140C can analyze the product tag collected in Block S120, access a database of preferred merchants, filter the database according to user purchasing habits and demographic, select the merchant based on a ranking of filtered merchants in the database that sell the product, and source a link to an external storefront (i.e., outside the social networking system) of the merchant based on a merchant profile stored in the database. However, Block S140C can correlate a portion of the image with a merchant in any other way.

Block S150A of first method S100 recites posting the image to a social feed of the particular brand within the social networking system. Generally, Block S150A functions to distribute the image, within the social networking system, based on the brand associated with the image in Block S140A. Block S150A therefore can post the image to a social feed of the brand, such as a photo feed, message board, timeline, or 'wall' managed by the brand within the social networking system. Therefore, Block S150A can aggregate brand-related images uploaded to the social networking system by one or more users, brands, merchants, stores, etc., into a single brand feed that is accessible to various users within the social networking system. For example, for a brand that is a clothing brand, a user can a access the brand feed to see official and unofficial images of various clothing items produced by the brand, compare advertising images with real-life people wearing the brand's clothing, view brand or clothing trends (e.g., how people are wearing certain items), etc.

In one implementation, Block S150A posts the image once a brand tag is applied to the image such that the image is in linear sequence with other images posted to the social feed and tagged with brand-related information. Block S150A can thus post each additional brand-tagged image to the top of the brand's photo feed, message board, timeline, wall, etc. Block S150A can similarly post the image once the brand approves the image and the brand tag.

Block S150A can additionally or alternatively selectively post the image to the brand's social feed. For example, Block S150A can filter out (i.e., withhold from posting to the brand's social feed) images of a quality below a threshold quality, such as blurry images or images with poor lighting. Similarly, Block S150A can order images in a queue of images to post to the brand's social feed based on image quality. For example, Block S150A can maintain a queue of images tagged with the brand and sourced from a private user within the social networking system, and Block S150A can post an image from the queue every hour based on a brand or merchant setting. Block S150A can further reorder images in the queue, such as according to image quality or any other image feature, as additional images are uploaded to the social networking system and tagged with the brand over time. Similarly, Block S150A can rank images, such as in the queue or directly in the brand's feed, based on an origin of each image. For example, Block S150A can rank a first image higher in a queue of images to post to the brand's social feed than a second image, wherein the first image was uploaded by a user with a history of uploading suitable-quality images with proper brand or product tags, and wherein the second user does not have a history of uploading images with brand or product tags or has a history of uploading poor-quality or inappropriate images. In this example, Block S150A can also rank a third image uploaded by the brand higher in the queue than the first image. Block S150A can implement similar functionality to change an order of images previously posted to the brand's social feed, such as by rearranging images in the brand's social feed in real time when a new image is uploaded by a private user and tagged with the brand and/or when a new image is uploaded and tagged by the brand directly. Therefore, as in these examples, Block S150A can control a quality of images in a queue of images in line to be posted to the brand's feed. Block S150A can similarly control a quality of images already posted to the brand's social feed.

Furthermore, Block S150A can implement machine vision and/or machine learning techniques to identify and filter out images with inappropriate or explicit content. Block S150A can also filter out images tagged with both the brand and any other brand or product that competes with the brand such that other (competing) brands or products are not advertised within the brand's social feed. However, Block S150A can extract any other feature, quality, or characteristic from an image tagged with the brand and implement any one or more of these features, qualities, or characteristics to control which or how images are posted to the brand's social feed.

Block S150A can additionally or alternatively enable a brand or representative to implement some or all of the foregoing functionalities manually, such as through the brand interface. For example, Block S150A can display images tagged with the brand in a private brand interface through which a human representative of the brand can manually review images, remove unwanted images, correct, edit, or adjust tags or hotspots, rank images, select images to be posted, post images, etc. Alternatively, the human representative can access the brand interface to adjust settings applied by Block S150A to automatically filter out unwanted images, arrange images in a queue, post images to the brand's social feed, rearrange images in the brand's social feed, etc. For example, the human representative can open the brand interface to set a threshold image quality, threshold image size, preferred image aspect ratio, threshold (maximum or minimum) number of allowable image tags, and/or preferred image origin (e.g., user, location). However, Block S150A can receive any other setting from the brand to control image selection, queuing, posting, etc. and can enable manual control of image selection, queuing, posting, etc. in any other suitable way.

Block S150A can also post the image to additional social feeds within the social networking system. For example, Block S150A can post the image to a social feed of a second user, within the social networking system, who subscribes to the brand. In this example, Block S150A can access a subscription, like, comment, etc. relating the second user to the brand and post the image to the second user's social feed accordingly. In another example, Block S150A can post the image to a social feed of a subsidiary, partner, and/or parent company of the brand, thereby propagating the image throughout the social networking system and increasing image exposure for potential customers. Furthermore, for the image tagged with multiple brands, Block S150A can post (or queue) the image to a social feed of each tagged brand or a subset of the tagged brands, such as based on settings specified by each brand as described above. However, Block S150A can function in any other way to post the image to a social feed of the particular brand within the social networking system.

Similarly, as shown in FIG. 2, Block S150B of one variation of first method S100 recites posting the image to a social feed within the social networking system, the social feed including photos related to the product. Generally, similar to Block S150A, Block S150B functions to distribute the image within the social networking system based on the product associated with the image in Block S140B. For example, Block S150B can post the image to a social feed allocated for the particular product with which the image is tagged, such as a photo feed, message board, timeline, or 'wall' managed by a brand or merchant to advertise the particular product. Therefore, Block S150B can aggregate product-related images uploaded to the social networking system by one or more users, brand, merchants, stores, etc., into a single product feed that is accessible to various users within the social networking system. For example, for the product that is a blouse, a user can access the product feed to see images of how the blouse fits on various people or models, to get ideas for pants, shoes, and other accessories that complement the blouse, or to see who (e.g., a Hollywood star, a friend) has worn the same blouse.

In one implementation, Block S150B posts the image once a product tag is applied to the image such that the image is in linear sequence with other images also posted to the social feed and tagged with product-related information. Block S150A can thus post each additional product-tagged image to the top of the product photo feed, message board, timeline, wall, etc.

Additionally or alternatively, like Block S150A, Block S150B can selectively post the image to the social feed of the product. For example, Block S150B can filter out images of a quality below a threshold quality, images that include inappropriate or explicit content, images of an improper size or aspect ratio, images tagged with other (competing) products and/or brands, images from certain users or locations, or images that fail to meet any other criteria. Block S150B can also implement machine vision and/or machine learning techniques to identify and filter out unsuitable or less desirable images. Furthermore, as described above, a (human) representative of a brand or merchant can set filter settings implemented by Block S150B to select images to post to the product feed. Block S150B (and Block S150A) can therefore implement various and/or unique filters for each brand or product feed within the social networking system. However, Block S150B can extract any other feature, quality, or characteristic from an image tagged with the product and implement any one or more of these features, qualities, or characteristics to control which or how images are posted to the social feed of the product.

Similar to Block S150A, Block S150B can also order or rank images in a queue of images to post to the social feed of the product. For example, Block S150B can post an image, tagged with the product and sourced from a private user within the social networking system, every 12 hours based on a brand or merchant setting and thus can maintain a queue of images to post. Block S150B can reorder images in the queue according to extracted image characteristics, such as image quality or image origin, as additional images are uploaded to the social networking system and tagged with the product over time. For example, Block S150B can rank a first image higher in a queue of images to post to the social feed of the product than a second image, wherein the first image is in focus and was taken with suitable lighting and wherein the second image is out of focus and dark. In this example, Block S150B can also rank a third image uploaded by a related brand and tagged with the product higher in the queue than the first image.

Like Block S150A, Block S150B can also modify an order of images previously posted to the social feed of the product when an additional image is added to the social feed of the product. For example, Block S150B can rearrange images in the social feed in real time when a new image is uploaded by a private user and tagged with the product and/or when a new image is uploaded and tagged by a related brand. Therefore, Block S150B can control a quality of images in a queue of images in line to be posted and/or can control how images already posted to the social feed of the product are viewed by users based on image quality.

Similar to Block S150A, Block S150B can additionally or alternatively enable a brand or brand representative to implement some or all of the foregoing functionalities manually, such as through the brand or product interface. For example, Block S150B can display images, tagged with the product, in a private interface through which a human representative of the brand can manually review images, remove unwanted images, correct, edit, adjust tags or tag regions, rank images, select images to be posted, post images, etc. Alternatively, a human representative can set a threshold image quality, threshold image size, preferred image aspect ratio, threshold (maximum or minimum) number of allowable image tags, preferred image origin (e.g., user, location), etc. from within the brand interface, and Block S150B can implement any of the entered settings to filter and post product-tagged images.

Block S150B can also post the image to additional social feeds within the social networking system. For example, Block S150B can post the image to a social feed of a second user within the social networking system who subscribes to the product, a brand that designs or produces the product, a merchant that sells the product, etc. In this example, Block S150B can access a subscription, "like", comment, etc. relating the second user to the brand and subsequently post the image to the second user's social feed accordingly.

Block S150A and Block S150B can also post the image to feeds, streams or other communication channels outside of the social networking system, such as through an iframe or a social plug in. Block S150A and Block S150B can further post the image to a third party site (i.e., a domain outside of the social networking system), such as accordingly an image purchase or image lease agreement. However, Block S150A and Block S150B can function in any other way to post the image to a social feed within the social networking system.

Block S160A of first method S100 recites, in response to interaction with the image in the social feed by a second user, directing the second user to brand content specified by the particular brand. Generally, Block S160A functions to implement a hotspot in the image by opening or linking to additional brand- or product-related content. For example, when a user clicks, touches, or otherwise selects the brand-tagged image or a hotspot within the image, Block S160A can direct the user to another page, menu, or interface within the social networking system, such as to a curated brand page. Alternatively, when a user clicks, touches, or otherwise selects the brand-tagged image or a hotspot within the image, Block S160A can direct the user outside of the social networking system, such as to a brand website, a blog associated with the brand, a brand-related native application, or an online standalone store for the brand.

In one implementation, Block S160A directs a user to additional brand content in response to user interaction with the image outside of the brand's social feed, as shown in FIG. 11. For example, Block S160A can link the user to the brand's social feed when the user selects the image when viewed through a non-commercial feed, such as when the user is reviewing his personal feed or viewing a "friend's" public feed. In another implementation, Block S160A directs the user to additional brand content in response to user interaction with the image when viewed within the brand's social feed. For example, Block S160A can link the user to a social feed of a particular product of the brand, to a brand store, or to a brand or product description page when the user selects the image when viewed through the brand's feed.

In an illustrative example of the foregoing implementations, Block Silo can upload an image, from a first user, of an individual wearing a super hero costume on Halloween. The first user can tag the image with the super hero, and Block S140A can associate the image with a particular brand (e.g., a comic brand) that owns and produces content related to the super hero. Block S130 can apply a super hero hotspot to the image, such as based on a region selection by the first user or by implementing machine vision to identify a super hero costume or insignia in the image. Block S150A can subsequently add the image to a queue of images to post to a super hero brand feed within the social network, the feed including posts about upcoming television shows, comics, trailers, and films featuring the super hero, actors who have played the super hero, and dates and trivia related to the super hero. In this example, when a second user selects the hotspot in the image from the first user's feed, Block S160A can direct the second user to the super hero brand feed within the social network. Alternatively, when the second user selects the hotspot in the image from the super hero brand feed, Block S160A can direct the second user to a brand page of a publishing company that owns and produces content pertaining to the super hero.

When a user selects the branded image, Block S160A can also open an intermediate page for the user. For example, when the user selects the image, Block S160A can open a menu with the image enlarged such that the user can view further details of the image. In this example, by expanding the image, Block S160A can present the image to the user at a higher resolution and thus enable the user to more easily select from multiple hotspots within the image, such as a hotspot for each of pair of shoes, a pair of pants, a blouse, a hat, and a necklace tagged in the image. Block S160A can then direct the user to various product pages, merchant or store pages, or portions of a brand page or social feed based on the user's intermediate selection within the enlarged image. Block S160A can also display callouts for each hotspot in the image, such as a product or brand description in response to a mouse-over event over a tagged product or a sidebar description with an arrow pointing to a related item within the image. In this implementation, Block S160A can selectively callout a subset of tagged items in the image, such as based on user purchasing history, user location and stock at a nearby brick-and-mortar retail location, a perceived user interest, a user demographic, etc., any of which can be stored on the social networking system.

Upon selection of the image by a user, Block S160A can link or direct the user to an intermediate page, splash page, menu, or other interface or page as specified by the brand. Alternatively, Block S160A can implement an interface or page specified by another user who uploaded the image or by another user who tagged the image. Block S160A can also specify the interface or page, such as by selecting a default brand page previously set by the brand when Block S140A correlates an item in the image with the brand. Selection of the image can also automatically flag the image for a designated photo album or collection, wherein Block S160A directs the second user to the photo album or collection. However, Block S160A can function in any other way to direct the second user to brand content specified by the particular brand in response to interaction with the image.

Block S160B of first method S100 recites, in response to interaction with the image in the social feed by the second user, directing the second user to an electronic storefront through which to purchase the product. Generally, Block S160B functions to implement a hotspot in the image by opening or linking to a venue through which the user may purchase the product, a similar product, and/or other products by the same brand as the product, as shown in FIG. 12. For example, when a user clicks, touches, or otherwise selects the product-tagged image or a hotspot within the image, Block S160B can direct the user to an online storefront of the brand or an online merchant that carries products from multiple brands. Alternatively, Block S160B can direct the user to an information page for a local brick-and-mortar retailer that carries the product or a stock-keeping page of a local retailer that maintains an updated inventory of in-stock items including the product. Like Block S160A, Block S160B can direct the user to a product, merchant, or brand page, interface, menu native application, etc. within or external the social networking system.

In one implementation, Block S160B directs a user to additional product content in response to user interaction with the image outside of the product feed. For example, Block S160B can link the user to a curated set of photos of products offered by a merchant, including the product associated with the image, when the user selects the image when viewed through a non-commercial feed, such as a personal feed or a friend's semi-private feed. Block S160B can similarly direct the user to the product social feed including images and/or information related to the product associated with the hotspot. In another implementation, Block S160B directs the user to additional product content in response to user interaction with the image when viewed within the product feed. For example, Block S160B can link the user to a product splash page, a merchant shopping interface, or a product-specific page within an online merchant website or native application when the user selects the image when viewed through the product feed.

In an illustrative example, Block S110 can upload an image, from a first user, of an individual wearing a super hero costume on Halloween. The first user can tag the image with the super hero, and Block S140B can associate the image with particular super hero-related products, including a super hero costume, a super hero comic, and a super hero film. Block S130 can apply a super hero costume hotspot to a first portion of the image, a super hero paper comic hotspot to a second portion of the image, and a super hero film hotspot to a third portion of the image. Block S150B can subsequently add the image to a super hero feed within the social network, the feed including posts about upcoming television shows, comics, trailers, and films featuring the super hero, actors who have played the super hero, and dates and trivia related to the super hero. In this example, Block S160B can direct a second user to an online costume store when the second user selects the super hero costume hotspot, to a website of a local comic book store when the second user selects the super hero comic hotspot, and to super hero film trailer in a native video sharing application when the second user selects the super hero film hotspot.

Similar to Block S160A, when a user selects the product image, Block S160B can open an intermediate product page for the user. For example, when the user selects the image, Block S160B can open a menu displaying the image enlarged such that the user can view further details of the image, select another product or hotspot with greater ease or resolution, and/or access more information about the product or a related brand or manufacturer. Block S160B can then direct the user to various product stores, merchants, or brand pages based on a user selection within the intermediate page. Block S160B can also display callouts for various hotspots in the image, such as a product or brand description in response to a mouse-over event over a tagged product or a sidebar description with an arrow pointing to a related item within the image. Like Block S160A, Block S160B can also selectively callout a subset of tagged items in the image, such as based on user purchasing history, user location, a perceived user interest, a user demographic, etc.

In another implementation, Block S160B (and/or Block S160A) directs a user to a local brick-and-mortar retail store through which to purchase the product, based on the user's location, when the user selects the image or a respective hotspot on the image. For example, Block S160B can access GPS data of a mobile computing device associated with the user's social networking profile to estimate a current location of the user. In another example, Block S160B can triangulate the location of the mobile computing device by analyzing signal strength between the mobile computing device and (three) local cellular towers. In yet another example, Block S160B can analyze a recent user check-in to predict a current user location. However, Block S160B can determine or estimate the location of the user in any other suitable way. Once the location of the user is determined, Block S160B can select a local retailer that is suitably close to the user, such as a retailer that is within five miles of the user's location and has the tagged product in stock. Block S160B can additionally or alternatively select the local retailer from a database of participating retailers and/or from a database of ranked or preferred retailers. Once a brick-and-mortar retailer is selected, Block S160B can direct the user to retailer information, such as the name and location of the retailer and/or a current stock of the retailer. For example, Block S160B can display the retailer's location and product availability through a native social networking application or a shopping application executing on the mobile computing device. Block S160B can also direct the user to a native maps application executing on the mobile computing device to guide the user to the brick-and-mortar retailer.

However, Block S160B can function in any other way or implement any technique similar to Block S160A to direct a second user to an electronic or brick-and-mortar storefront through which to purchase the product in response to interaction with the image in the social feed by the second user. Furthermore, Block S160B can function independently of or in cooperation with Block S160A to direct the user to one or more product- and/or brand-related pages, interfaces, menus, etc. within or outside the social networking system.

As shown in FIG. 3, one variation of first method S100 includes Block S170, which recites rewarding the first user. In one implementation, Block S170 rewards the first user in response to uploading the image that is eventually tagged with a brand or product, either by the first user or by another user in the social networking system. In another implementation, Block S170 rewards the first user in response to receiving the tag (e.g., in Block S120). In these implementations, Block S170 functions to incentivize private users in the social networking system to upload and/or tag images, thereby populating the social networking system with crowdsourced visual advertisements for brands and/or products. In yet another implementation, Block S170 rewards the user in response to selection of his tagged image or a tag therein by another user (e.g., the input from the second user). In this implementation, Block S170 functions to reward users for supplying content (tags and images) that result in click-throughs by other users, which can thus incentivize quality and/or interesting images, as well as correct and/or interesting tags, thereby potentially limiting a need for the brand, the store, the merchant, the social networking system, etc. to regulate or inspect tagged images prior to posting the images to one or more social feeds. In this implementation, Block S170 can reward a user proportionally (e.g., linearly, exponentially) with traffic across an image or tag provided by the user, or Block S170 can reward the user once a threshold number of views or click-throughs is reached. However, Block S170 can reward a user based on any other action or according to any other schema.

Block S170 can reward a user with any one or more perks. For example, Block S170 can reward the user with an extended privilege within the social networking system or extended access to a brand or product page. In this example, the user can be rewarded with early access to or early alerts for new products offered by the brand or new products similar to the product tagged in the image uploaded by the user. In another example, Block S170 can reward the user with an offer from the brand or a merchant that sells the brand's products, such as a discount on a future purchase or a free sample. In other examples, Block S170 can reward the user with a monetary reward or promoted distribution of the image within the social networking system. Block S170 can also reward the user with one or more loyalty points redeemable through the merchant, wherein the user can redeem the loyalty points(s) for a free item from a merchant or a discounted purchase from the merchant. Block S170 can also reward the user with "clout" or other influence within the social networking system, such as by adjusting how the user is ranked in searches by other users within the social network and/or by adjusting how a post by the user is ranked in an aggregated news feed of posts by multiple users within the social network. However, Block S170 can reward the user in any other way and according to any other schema.

As shown in FIG. 3, one variation of first method S100 includes Block S180, which recites displaying a visual cue contiguous with the image in the social feed. The image, with hotspots, can be posted to a social feed including only images and/or to a social feed excluding conspicuous advertising, such as sidebar advertisements or interspersed advertisements that disrupt the social feed. Because the image can be of a substantially similar appearance with and/or form factor of other images, in the social feed, that do not include hotspots or links to a product, brand, or merchant page, Block S180 can therefore apply a visual indicator of hotspot availability on the image. Generally, Block S180 functions to apply the visual cue to the image such that a user viewing the image in the social feed may comprehend that the image includes a hotspot but without substantial disruption to the form or visual appearance of the social feed.

In one implementation, Block S180 highlights the image, in the social feed, with a visual cue that is a border around the image. For example, Block S180 can apply a five-pixel wide green border around the image. In this implementation, Block S180 can also select the border color and/or border thickness based on the type and/or number of hotspots in the image. For example, Block S180 can apply a two-pixel wide green border to an image with one product tag, a two-pixel wide orange border to an image with one brand tag, a four-pixel wide green border to an image with two product tags, and a two-pixel wide orange border inside a two-pixel wide green border to an image with one brand tag and one product tag. In this implementation, Block S180 can also animate the border to draw attention to the image, such as by flashing, pulsing, or fading the border. Block S180 can also change the color or size of the border as more users view or click on the image, such as by transitioning the border from green to yellow to orange to red as the number of image views increases. Block S180 can further remove the border on the image for a user who has already clicked on or previously viewed the image.

In another implementation, Block S180 applies the visual cue directly on the image. For example, Block S180 can implement a machine vision technique (e.g., object recognition) to identify the product in the image and apply a border around the product within the image, such as a white border in the image that is dark and a green border in an image that is bright but with muted colors. Block S180 can additionally enlarge or animate the product with the image in order to draw attention to a hotspot on the image or over the product. However, Block S180 can function in any other way to visually indicate the presence of a hotspot in the image.

As shown in FIG. 3, one variation of first method S100 includes Block S190, which recites determining an interest of a second user based on browsing history of the second user within the social networking system and posting the image to a social feed of the second user according to the determined interest that is related to the product. Generally, Block S190 can analyze user information stored in the social networking system, such as demographic, education, birth date, browsing history, friends or other connections, occupation, likes, etc. to estimate the relevance of the tagged image to a user. If Block S190 predicts that a user may have an interest in a product or brand tagged in the photo, Block S190 can post the photo to the user's personal feed within the social networking system. Alternatively, Block S190 can rearrange or rank posts in any other social feed within the social networking system to increase visibility of the image to the user when the user views the other social feed. For example, a clothing brand can produce several different classifications of items, including shirts, pants, jackets, watches, purses, shoes, socks, and scarves, but Block S190 can predict that the user is not interested in anything but shirts, pants, and jackets from the brand based on past user transaction history. In this example, when the user views the brand's social feed, Block S190 can rearrange images in the feed specially for the user according to the user's predicted interests, including placing images tagged with shirts, pants, and jackets at the top of the brand's social feed and placing images tagged with watches and purses at the bottom of the social feed. However, Block S190 can function in any other way to determine an interest of a user and to control or adjust access to a brand- or product-tagged image accordingly.

2. Second Method

Figure 4:
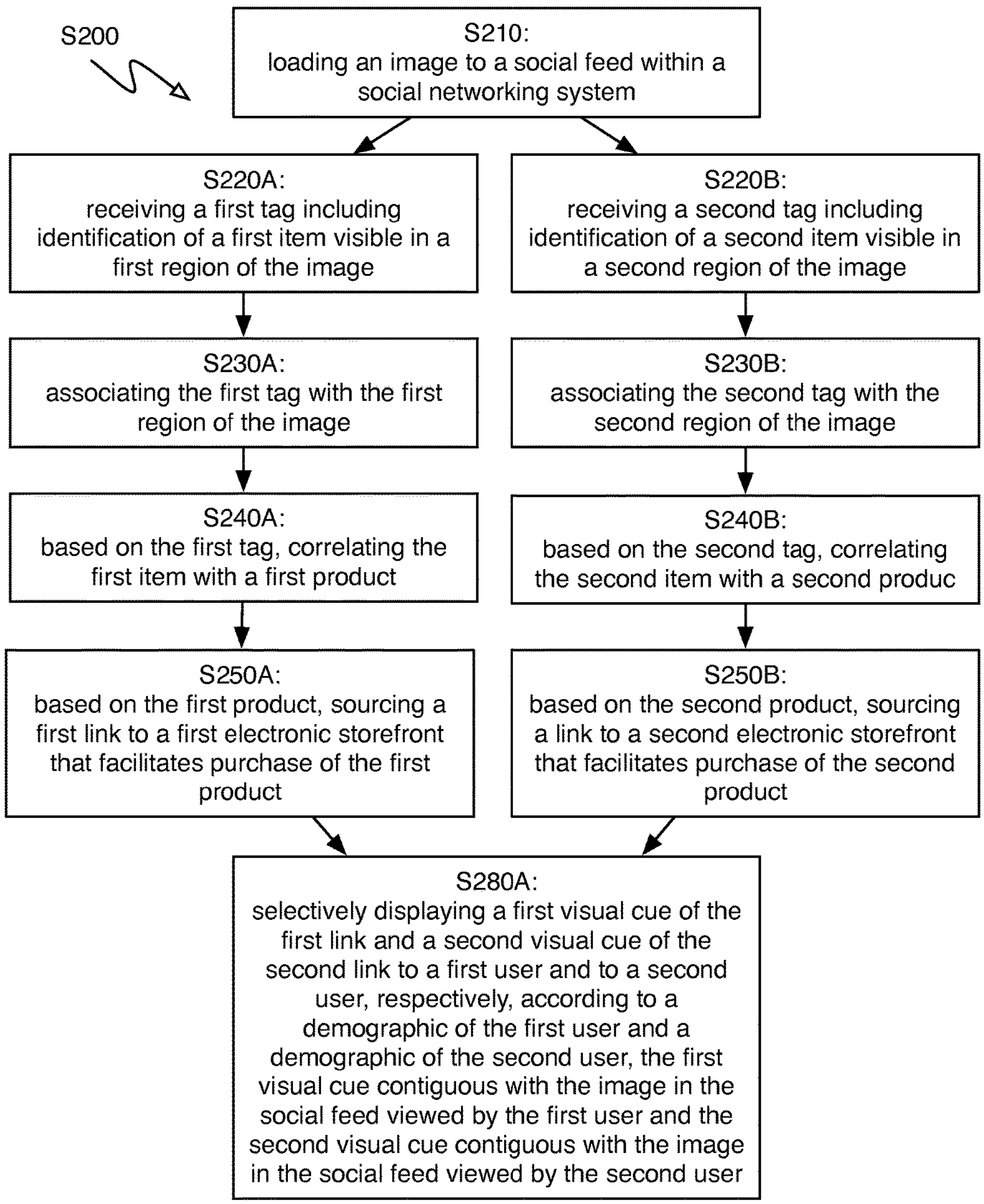
FIG. 4 is a flowchart representation of a second method of one embodiment.

As shown in FIG. 4, a second method S200 for selectively advertising items in an image includes: loading an image to a social feed within a social networking system in Block S210; receiving a first tag including identification of a first item visible in a first region of the image in Block S220A; associating the first tag with the first region of the image in Block S230A; based on the first tag, correlating the first item with a first product in Block S240A; based on the first product, sourcing a first link to a first electronic storefront that facilitates purchase of the first product in Block S250A; receiving a second tag including identification of a second item visible in a second region of the image in Block S220B; associating the second tag with the second region of the image in Block S230B; based on the second tag, correlating the second item with a second product in Block S240B; based on the second product, sourcing a link to a second electronic storefront that facilitates purchase of the second product in Block S250B; and selectively displaying a first visual cue of the first link and a second visual cue of the second link to a first user and to a second user, respectively, according to a demographic of the first user and a demographic of the second user, the first visual cue contiguous with the image in the social feed viewed by the first user and the second visual cue contiguous with the image in the social feed viewed by the second user in Block S280A.

Figure 5:
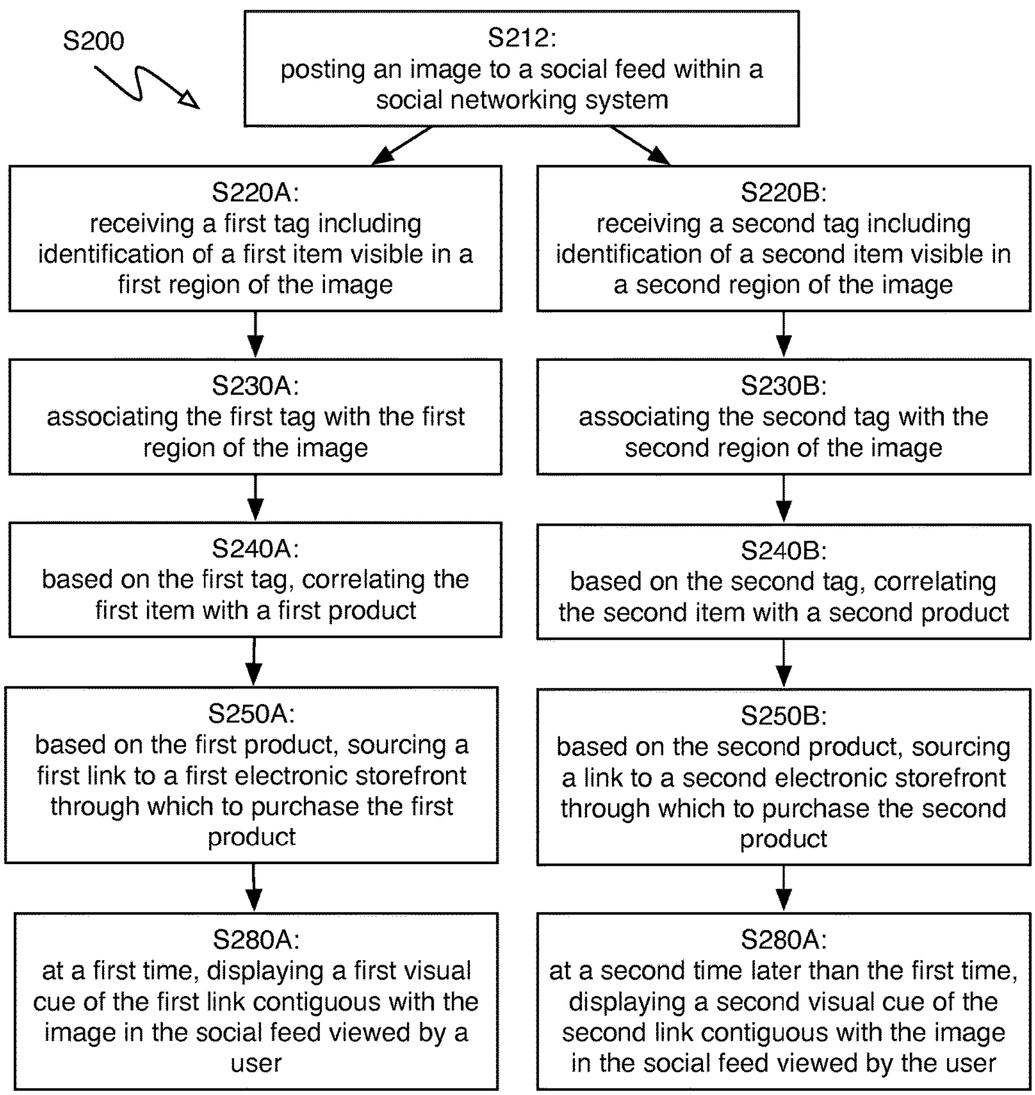
FIGS. 5 and 6 are flowchart representations of two variations of the second method.

As shown in FIG. 5, one variation of second method S200 includes: posting an image to a social feed within a social networking system in Block S212; receiving a first tag including identification of a first item visible in a first region of the image in Block S220A; associating the first tag with the first region of the image in Block S230A; based on the first tag, correlating the first item with a first product in Block S240A; based on the first product, sourcing a first link to a first electronic storefront through which to purchase the first product in Block S250A; receiving a second tag including identification of a second item visible in a second region of the image in Block S220B; associating the second tag with the second region of the image in Block S230B; based on the second tag, correlating the second item with a second product in Block S240B; based on the second product, sourcing a link to a second electronic storefront through which to purchase the second product in Block S250B ; at a first time, displaying a first visual cue of the first link contiguous with the image in the social feed viewed by a user in Block S280B; and at a second time later than the first time, displaying a second visual cue of the second link contiguous with the image in the social feed viewed by the user in Block S280C.

Figure 13:
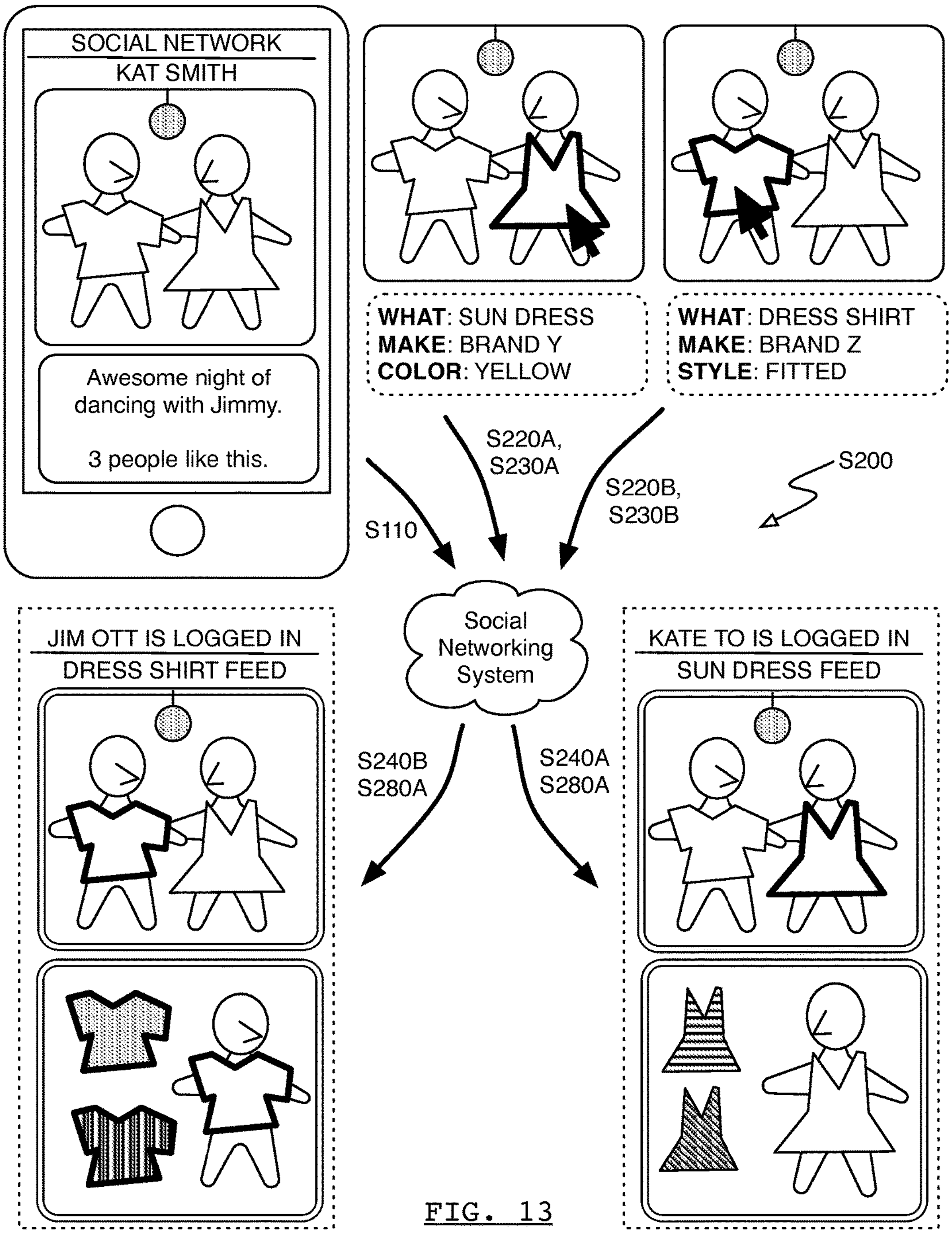
FIGS. 13 and 14 are flowchart representations of two variations of the second method.
Figure 14:
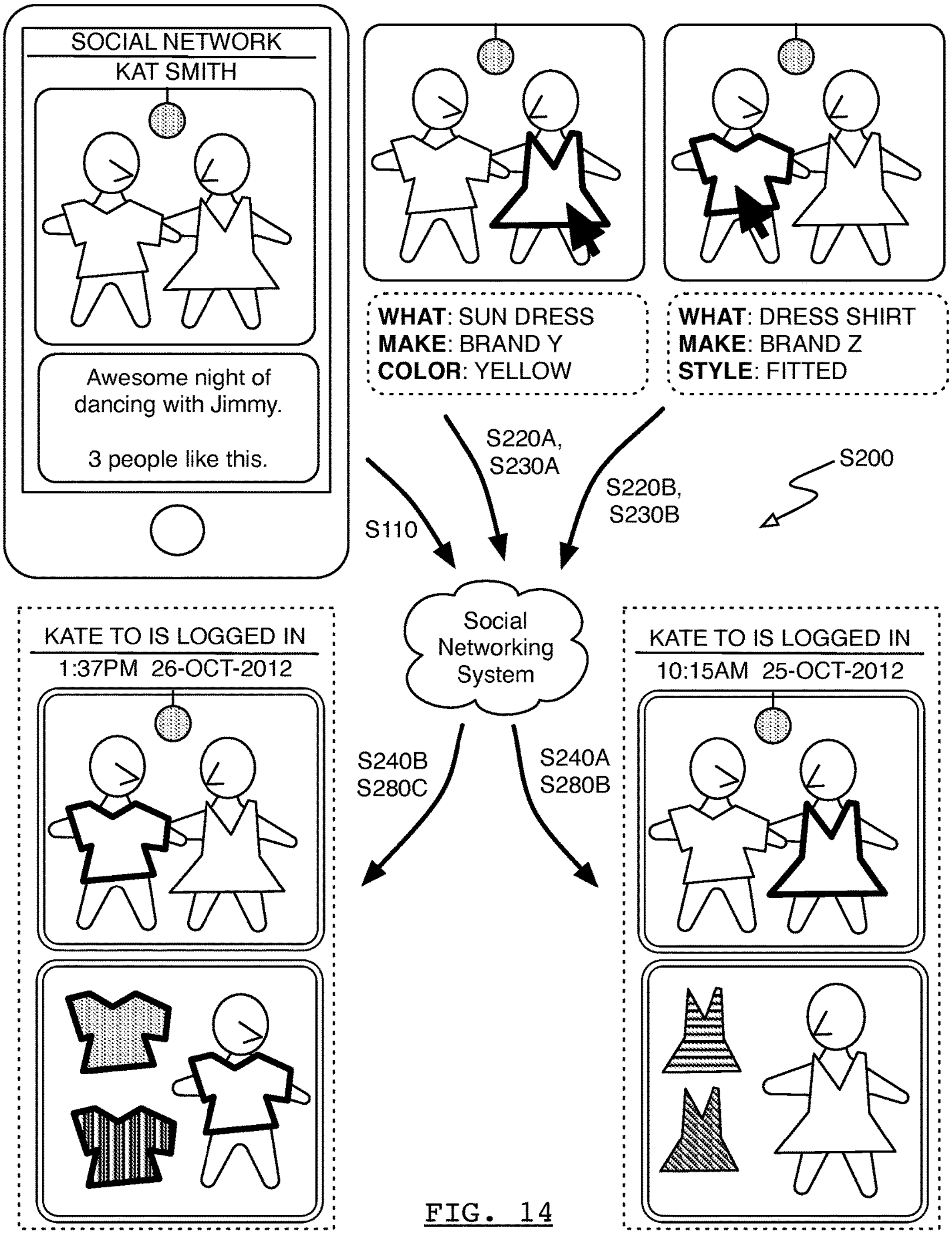

Generally, as shown in FIG. 13, second method S200 functions to implement visual cues on, around, or proximal an image (of first method S100) to advertise various products and/or brands to different users, such as based on user demographic or a perceived user interest. Similarly, as shown in FIG. 14, the variation of second method S200 functions to implement visual cues on, around, or proximal an image of first method S100 to advertise various products and/or brands to one user at different times. Second method S200 and associated variations can therefore implement images tagged with product- or brand-related metadata and displayed through a social feed within a social networking system to direct users to various brand-related websites, pages, or storefronts within or external the social networking system. Therefore, second method S200 enables targeted advertising to users through official and/or unofficial images displayed to users through one or more social feeds within a social networking system and further enables users to access additional brand- and/or product-related information by setting links (e.g., hotspots) within the images.

Like first method S100 described above, second method S200 can be implemented by a computer system, such as through an online photo-sharing platform or a social networking system that executes on the computer system and uploads photos to social feeds, displays the photos to various users, such as based on user subscriptions or connections to other users or entities within the platform or network, and enables advertising to users through tagged photos. The computer system can be a cloud-based computer (e.g., Amazon EC2), a mainframe computer system, a grid-computer system, or any other suitable computer system. As described above, the computer system can support photo sharing within a social feed, wherein at least one photo in the social feed functions as a visual advertisement to link a user to additional brand, product, merchant, or store content. For example, the computer system can upload a photo and associated tags over a distributed network, such as over the Internet, and one or more processors throughout the distributed network can implement one or more Blocks of second method S200 to post the photo to the social feed and direct a user from the photo to additional related content. A user, merchant, brand, etc. can access images, product- or brand-related information, advertising settings, etc. through a web browser or native application executing on a computing device, such as a laptop computer, a desktop computer, a tablet, a smartphone, a personal data assistant (PDA), a personal music player, etc. However, second method S200 can be implemented on or by any other computer system, service, network, etc. and can include any other interface to support advertising, data collection, data sharing, and data analysis.

Block S210 of second method S200 recites loading an image to a social feed within a social networking system. Generally, Block S210 functions like Block S110 of first method S100 to receive an image from another (e.g., third) user and to upload the image to the social networking system, as shown in FIG. 13. As described above, the image can be a digital or electronic image that is static, such as a color, black-and-white, or sepia photograph, or dynamic, such as a video, meme, or other visual image. However, Block S210 can function in any other way to load the image to the social feed within the social networking system.

As shown in FIG. 5, Block S212 of one variation of second method S200 recites posting the image to a social feed within the social networking system. Generally, Block S212 functions like Block S110 of first method S100 to post the image to the social feed. For example, as described above, a third user can capture a photographic image through a camera integrated into a smartphone, and Block S212 can then upload the photographic image to the third user's personal social feed within the social networking system. Block S212 can further share (i.e., repost) the photographic image across various other feeds within the social networking system, such as by reposting the photographic image to a social feed of another user who is a "friend" or other connection to the third user, such as a social feed of the first user and a social feed of the second user. However, Block S212 can post the image to a social feed within the social networking system.

Block S220A of second method S200 recites receiving a first tag including identification of a first item visible in a first region of the image. Similarly, Block S220B of second method S200 recites receiving a second tag including identification of a second item visible in a second region of the image, as shown in FIG. 14. Generally, Blocks S220A and S220B implement methods and techniques of Block S120 of first method S100 described above to collect tags from users within the social networking system, wherein each tag is associated with at least one region of the image and specifies at least one product, brand, designer, store, merchant, model (i.e., person or product), manufacturer, etc. related to an item represented in the respective region of the image. Blocks S220A and S220B therefore cooperate to collect tag information that second method S200 can implement to define various advertisements within the image. For example, Block S210 can upload the image from a third user and Block S220A can substantially simultaneously receive a brand or product tag from the third user. Block S220B can subsequently receive the second tag from a brand representative who retroactively adds the second tag to the image, such as minutes, hours, days, or weeks after Block S210 first uploaded the image.

Each tag received through Block S220A, Block S220B, etc. can include a link or pointer to a brand, product, or merchant website outside of the social networking system or a link or pointer to a brand, product, or merchant social feed or profile within the social networking system. Alternatively, Block S220A, Block S220B, etc. can receive tags that include a product or brand description, make, model, product line name or code, stock keeping unit (SKU) number, bar code, merchant ID, or other identifier of the product or brand. For example, Block S220A can implement key word extraction to analyze a tag and thus identify a brand or product in the image. In this example, Block S230A can then attach a link or pointer to a respective region of the image based on the identifier extracted from the tag in Block S220A.

In one example, Block S210 uploads an amateur candid photograph from a third user to the third user's personal social feed within the social networking system. Block S220A then receives a shoe brand tag, for a pair of shoes shown in the image, from the third user, and Block S220B receives a soda brand and product tags for a soda can, shown in the image, from a second user. Similar Blocks of second method S200 can further receive a vehicle manufacturer tag for a vehicle shown in the image from a third user, a clothing item tag for a clothing item shown in the image from a fourth user, etc.

Like Block S120 of first method S100, Block S220A and/or S220B can enable an image owner (i.e., the entity that uploaded the image, e.g., a user or a brand) to control which image tags are applied to an uploaded image, such as by approving, disapproving, or removing tags added to the image by other users, brands, etc.

As in Block S120 of first method S100 described above, Blocks S220A and S220*b* can prompt a user, brand representative, etc. to select a particular region of the image on which to apply a tag. Blocks S230A and S230B can then implement the tags and selected regions as hotspots that link to additional brand- or product-related content. The selected regions of the image corresponding to the tags can be discrete (i.e., non-overlapping) and/or overlapping and can be of the same, similar, or dissimilar size and/or shape. Alternatively, as described above, Blocks S220A and S220B can implement object recognition, character recognition, template matching, edge detection, and/or any other machine vision and/or machine learning technique to automatically identify a product or brand represented in the image. However, Block S220A and S220B can function in any other way to receive the first tag including identification of the first item visible in the first region of the image and to receive the second tag including identification of the second item visible in the second region of the image.

Block S230A of second method 5200 recites associating the first tag with the first region of the image. Similarly, Block S230B of second method S200 recites associating the second tag with the second region of the image. Generally, Blocks S230A and S230B implement methods and techniques similar to those implemented by Block S130 of first method S100 described above to apply tags, received from a user, brand representative, etc., to the image. Blocks S230A and S230B can therefore define multiple hotspots in the image through which a user (e.g., the first user, the second user) can access additional brand, product, merchant, or other related information through each hotspot. As described above, Blocks S230A and S230B can define the hotspots as discrete (i.e., non-overlapping), partially overlapping, or fully overlapping regions of the image. Blocks S230A and S230B can further interface with Block S240A and S240B, respectively, to define hotspots that link or direct a user to an external brand or product webpage, a brand or product page within the social networking system, an external native application or "app," a pop-up window, a sliding menu, an intermediate page or menu, or other interface through which the user can access additional product or brand information and/or complete a product- or brand-related purchase. However, Blocks S230A and Block S230B can function in any other way to associate the user- or brand-supplied tags with the various regions of the image.

Block S240A of second method S200 recites, based on the first tag, correlating the first item with a first product. Similarly, Block S240B of second method S200 recites, based on the second tag, correlating the second item with a second product. Generally, Blocks S240A and S240B implement methods and techniques similar to those implemented by Block S140B of first method S100 described above to associate a hotspot, defined by Blocks S230A and S230B, with particular products to enable access to product-related information through the hotspot. For example, by correlating a first item in the image with a first product, Block S240A can enable Block S260 to direct a first user from a first hotspot to an external online store that sells the first product. Furthermore, in this example, by correlating a second item in the image with a second product, Block S240B can enable Block S260 to direct a second user from a second hotspot to an internal brand page for a brand that markets the second product. In another example, by identifying the first product, Block S240A can enable Block S250A to source a first link to a first electronic storefront through which a user can purchase the first product, and, by identifying the second product, Block S240B can similarly enable Block S250B to source a second link to a second electronic storefront through which a user can purchase the second product. Block S140B can therefore analyze tag information entered by a user, brand representative, etc. in Block S120 to identify a product related to one or more regions of the image and to associate the identified product with one or more regions of the image. However, Block S240B can correlate a portion of the image with a product in any other way.

Blocks S240A and/or S240B can therefore analyze tag information entered by one or more users, brand representatives, etc. in Blocks S220A and S220B to identify products related to one or more regions of the image and to associate identified products with various regions of the image. However, Blocks S240A and S240B can correlate regions of the image with various items in the image in any other way.

Block S250A of second method S200 recites, based on the first product, sourcing a first link to a first electronic storefront that facilitates purchase of the first product. Similarly, Block S250B of second method S200 recites, based on the second product, sourcing a link to a second electronic storefront that facilitates purchase of the second product. Generally, Blocks S250A and S250B function to define target paths for the first and second hotspots in the image based on the first and second products identified in Block S240A and S240B, respectively. As described above, the target path specified by the link can be an electronic storefront within the social networking system, an online storefront on a website outside the social networking system, a standalone native shopping application, or any other electronic venue accessible through a computing device to purchase a product. Alternatively, as described above, the target path specified by the link can be an information page, pop up message, notification, etc. internal or external the social networking system, that contains information related to a brick-and-mortar store that carries a particular product identified in the image.

In one implementation, Block S250A predefines the first link for the first hotspot by comparing the first product, correlated with the first item visible in the image in Block S240A, with a database of electronic storefronts to identify a subset of electronic storefronts that carry the first product. For the subset of electronic storefronts that includes multiple suitable storefronts, Block S250A can select an electronic storefront that is ranked highest in the set. In one example, merchants purchase rankings through contracts with the social networking system. In another example, the social networking system ranks merchants based on a revenue share contract between the merchant and the social networking system or based on a promotional period paid for by a particular merchant. In yet another example, the social networking system can rank merchants based on user likes or feedback from users within the social networking system. Similarly, the social networking system can rank merchants according to a number of merchant transactions or revenue amounts from merchant transactions initiated through second method S200 implemented by the social networking system. In another example, Block S250A analyzes data of social networking system users to identify characteristics of users with predicted interest in the first product. In this example, Block S250A can analyze user transaction history, likes, shares, posts, reposts, demographic information, browsing history, etc. to thus rank stores substantially relevant to users sharing a potential interest in or need for the first product. In the foregoing examples, Block S250A can implement storefront rankings to select the first electronic storefront from the subset of electronic storefronts and can then apply a link to the selected first storefront to the first hotspot. Block S250B can implement similar techniques to preselect a link to a second storefront for the second hotspot.

In another implementation, Block S250A selects the first link for the first hotspot substantially in real time. In this implementation, when the first user opens, views, or otherwise accesses the image, Block S250A retrieves user data stored by the social networking system and implements the user data to select the electronic store that is particularly relevant to the first user. For example, Block S250A can analyze user transaction history, likes, shares, posts, reposts, demographic information, browsing history, level of engagement in social commentary within the social networking system, friend or connection count, etc. to identify online or brick-and-mortar stores previously visited by the first user, user shopping trends, a user interest, other brands or products of interest to the first user (e.g., another product which the first user may purchase with the first product), shopping, payment, and/or shipping preferences, etc. From this information, Block S250A can select a particular electronic storefront, from a list of available or preferred electronic storefronts, that is particularly relevant to the first user. For example, Block S250A can select the particular electronic storefront through which the first user has previously shopped, that carries multiple brands preferred by the first user, that retains past shipping and billing information of the first user, etc. and set the first hotspot to link to the particular electronic storefront. In another example, Block S250A can retrieve location data of the first user (e.g., via GPS or cellular data from a mobile computing device carried by the first user), filter a set of brick-and-mortar storefronts down to local storefronts based on the first user's location, and select the particular local storefront that carries other items and/or brands of potential interest to the first user. In this example, Block S250A can then set the first hotspot to link to an information page for the particular local storefront. Block S250A can further implement the first user's data to anticipate an interest of the first user in any other (i.e., unrelated) product or brand and to select the particular electronic or local storefront that also carries the other product or brand. Block S250B can implement similar techniques to select the second link for the second hotspot substantially in real time when the second user opens, views, or otherwise accesses the image. However, Blocks S250A and S250B can function in any other way to source links to electronic storefronts that facilitate purchase of the first and second products.

Block S280A of second method S200 recites selectively displaying a first visual cue of the first link and a second visual cue of the second link to a first user and to a second user, respectively, according to a demographic of the first user and a demographic of the second user, the first visual cue contiguous with the image in the social feed viewed by the first user and the second visual cue contiguous with the image in the social feed viewed by the second user. Generally, Block S280A functions to display visual cues of different hotspots in the image based on a characteristic of a user viewing the image, as shown in FIG. 13. Block S280A can select a visual cue of a hotspot to display to a user based on any one or more of an age, gender, education, race or ethic background, occupation, income level, browsing history, likes, posts, reposts, shares, or pins within the social networking system, transaction history, etc. Block S280A can additionally or alternatively select a visual cue of a hotspot to display to a user based on any user interest entered into the social networking system or estimated in Block S280A. For example, Block S280A can estimate a user interest based on browsing history, any of the foregoing user data stored in the social networking system, or aggregated positive responses to posts within the social networking system. Block S280A can therefore determine an interest of the first and/or second users and selectively display the first and second visual cues according to a correlation between a user interest and a product corresponding to a visual cue displayed to a user.

In one example implementation, Block S280A selects the visual cue based on the gender of a user. In one example in which the image is of a man sitting on a motorcycle and conversing with a woman, Block S280A can display a first visual cue indicating a first hotspot on the motorcycle when a first user who is a male views the image, and Block S280A can display a second visual cue indicating a second hotspot on the woman's shoes when a second user who is a female views the image. In another example implementation, Block S280A selects the visual cue based on a perceived interest of a user. In the foregoing example in which the image is of a man sitting on a motorcycle and conversing with a woman, Block S280A can display a first visual cue indicating a first hotspot over the whole motorcycle when a first user views the image, and Block S280A can display a second visual cue indicating a second hotspot over a custom wheel on the motorcycle when a second user views the image. In this example, Block S280A can determine that the first user is interested in motorcycles based on the first user's browsing history and that the first user can afford a new motorcycle based on the current average salaries for an occupation entered into the first user's social networking profile. Furthermore, in this example, Block S280A can determine that the second user is interested in custom motorcycle wheels based on search strings entered by the second user and that the second user can afford new motorcycle wheels based on the second user's recent transaction history.

Block S280A can therefore display to a user a particular visual cue that corresponds to a product or brand that is of particular interest or need to the user, thereby targeting advertisement of a particular brand or product or a subset of brands and/or products represented in the image and most likely to effect the user to make a purchase. Block S280A can implement this functionality by analyzing user-specific data, such as data entered into the social networking system by the user or user transaction or browsing history. Alternatively, Block S280A can implement this functionality by grouping a user into a demographic- or characteristic-dependent advertising "bucket," including other users of similar characteristics or demographics, based on stored user data. However, Block S280A can selectively display a visual cue for a user viewing the image according to any other characteristic or combination of characteristics of the user.

Block S280A can selectively display a visual cue of a hotspot within the image when the image is viewed, by a user, within his personal social feed (e.g., when the user subscribes to a brand feed and the image is tagged with a product by the brand and automatically posted to the user's feed), when viewed within a private or semi-private social feed of a friend or connection of the user, when viewed in a public or semi-private social feed of a brand, merchant, or product, when viewed through any other feed within the social networking system, or when viewed through a third-party website or interface associated with the brand or located near a business associated with the brand.

Block S280A can implement functionality similar to Block S180 of first method S100 described above to display a visual cue. In one example implementation, Block S280A displays a visual cue by highlighting the image with a colored border when viewed by a user. In this example implementation, the first and second visual cues can be substantially identical but indicate the presence of different hotspots within the image based on characteristics of the first and second users. In another example implementation, Block S280A can display a first pulsing virtual button over the first region (e.g., first hotspot) of the image when viewed by the first user, and Block S280A can display a second pulsing virtual button over the second region (e.g., second hotspot) of the image when viewed by the second user. However, Block S280A can display the first, second, and/or other visual cues in any other suitable form(s) or size. The first and second visual cues can be substantially identical or otherwise substantially unique, such as dependent on (e.g., unique to) an associated item (e.g., product or brand) in the image, a preference of a user, a number of items advertised to a user in one image, a time of day or season, or a user characteristic or history. Block S280A can also adjust a visual cue for a particular hotspot in the image based on how many times a user has viewed the image and/or visual cue, a device on which a user views the image (e.g., laptop computer, smartphone, or tablet), a browser or native application through which a user views the image, past user responses (e.g., likes, reposts, comments) to the image, a similar image, the brand, the product, or a similar product, etc.

Block S280A can also display the first visual cue without the second visual cue when the first user views the image, and Block S280A can substantially simultaneously display the second visual cue without the first visual cue when the second user views the image. Block S280A can also display both the first visual cue and the second visual cue when the first user views the image, such as if Block S280A determines first user interest in both the first and second items in the image, and Block S280A can substantially simultaneously or later display the second visual cue without the first visual cue when the second user views the image. However, Block S280A can display the visual cues to the first and second users in any other suitable combination, and Block S280A can function in any other way to selectively display the first and second visual cues with the image when viewed by the first and second users.

As shown in FIG. 5, Block S280B of one variation of second method S200 recites, at a first time, displaying a first visual cue of the first link contiguous with the image in the social feed viewed by a user. Similarly, as shown in FIG. 5, Block S280C of one variation of second method S200 recites, at a second time later than the first time, displaying a second visual cue of the second link contiguous with the image in the social feed viewed by the user. Generally, Blocks S280B and S280C function to advertise different items to a user viewing the image over time and/or at different times, as shown in FIG. 14. Blocks S280B and S280C can apply visual cues as described above or any other suitable visual cue to visually indicate to a user the availability of one or more hotspots on the image.

In one implementation, Block S280C updates the first visual cue displayed by Block S280B by replacing the first visual cue for a first item in the image with a second visual cue for a second item in the image once the user has viewed the image for a threshold viewing time. In this example implementation, the threshold viewing time can be continuous, such as six continuous viewing seconds. Alternatively, the threshold viewing time can be discontinuous, such as a total of six viewing seconds over multiple views of the image by the user. In this implementation, second method S200 can set the threshold viewing time, such as based on an age or demographic of the user. For example, second method S200 can set the threshold viewing time as four seconds for a teenage user and six seconds for a user in his sixties.

In another implementation, Block S280B displays the first visual cue to the user when the user first views the image, and Block S280C displays the second visual cue to the user when the user returns to the image at a later time, as shown in FIG. 14. For example, second method S200 can transition from Block S280B to Block S280C when the user returns to the image after selecting the first hotspot. In another example, second method S200 can transition from Block S280B to Block S280C once the user views the image for a first time in a social feed, scrolls through the social feed or navigates to the another page or application, and then returns to the image or views the image in another social feed. However, Blocks S280B and S280C can function in any other way to display the first and second visual cues to a user over time.

Figure 6:
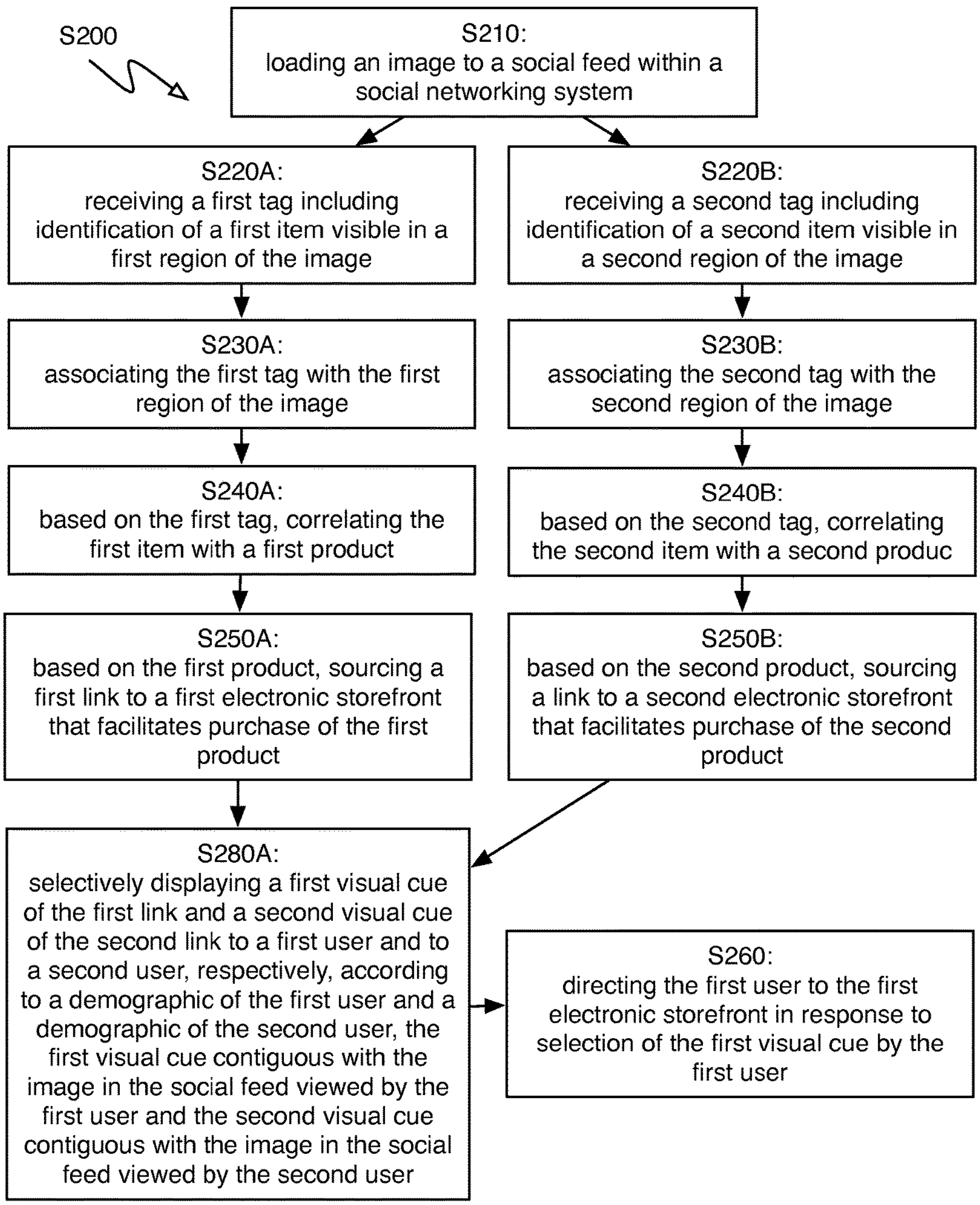

As shown in FIG. 6, one variation of second method S200 includes Block S260, which recites directing the first user to the first electronic storefront in response to selection of the first visual cue by the first user. Block S260 can similarly direct the (first or) second user to the second electronic storefront in response to selection of the second visual cue by the (first or) second user. Generally, Block S160B functions similar to Block S160B of first method S100 to direct a user to brand- and/or product-related content when the user selects a visual cue displayed on, around, or adjacent the image. For example, Block S260 can direct the first user to a product page of a first merchant within the social networking system when the first user selects a related hotspot. In this example, the product page can include a curated set of photos of products offered by the first merchant. In another example, Block S260 can direct the first user to a first electronic storefront through which the first user can purchase a product associated with the first hotspot.

Block S260 can capture user selection of a hotspot when a user swipes the image horizontally across a touch-sensitive display (touchscreen), when a user taps or touches an area of the touch display that corresponds to a hotspot, when a user selects the hotspot with a mouse or stylus, or when the user interacts with the image or a portion of the image in any other way. Once Block S260 receives a hotspot selection from the user, Block S260 can further direct the user to the online storefront, brick-and-mortar store information page, or other target path associated with the hotspot in Block S250A or Block S250B, etc. Block S260 can also capture user selection of a hotspot through voice-activated interactions.

In one implementation, Block S260 cooperates with Block S250A and/or Block S250B to retrieve user location data through a mobile computing device carried by the user in response to selection of the visual cue, to identify a brick-and-mortar retail outlet of a merchant proximal the user based on the user's location data, and to display a location of the brick-and-mortar retail outlet and product availability at the retail outlet when the user selects the visual cue. However, Block S260 can function in any other way to direct users to the electronic or brick-and-mortar storefront information in response to selection of visual cues.

3. Third Method

Figure 7:
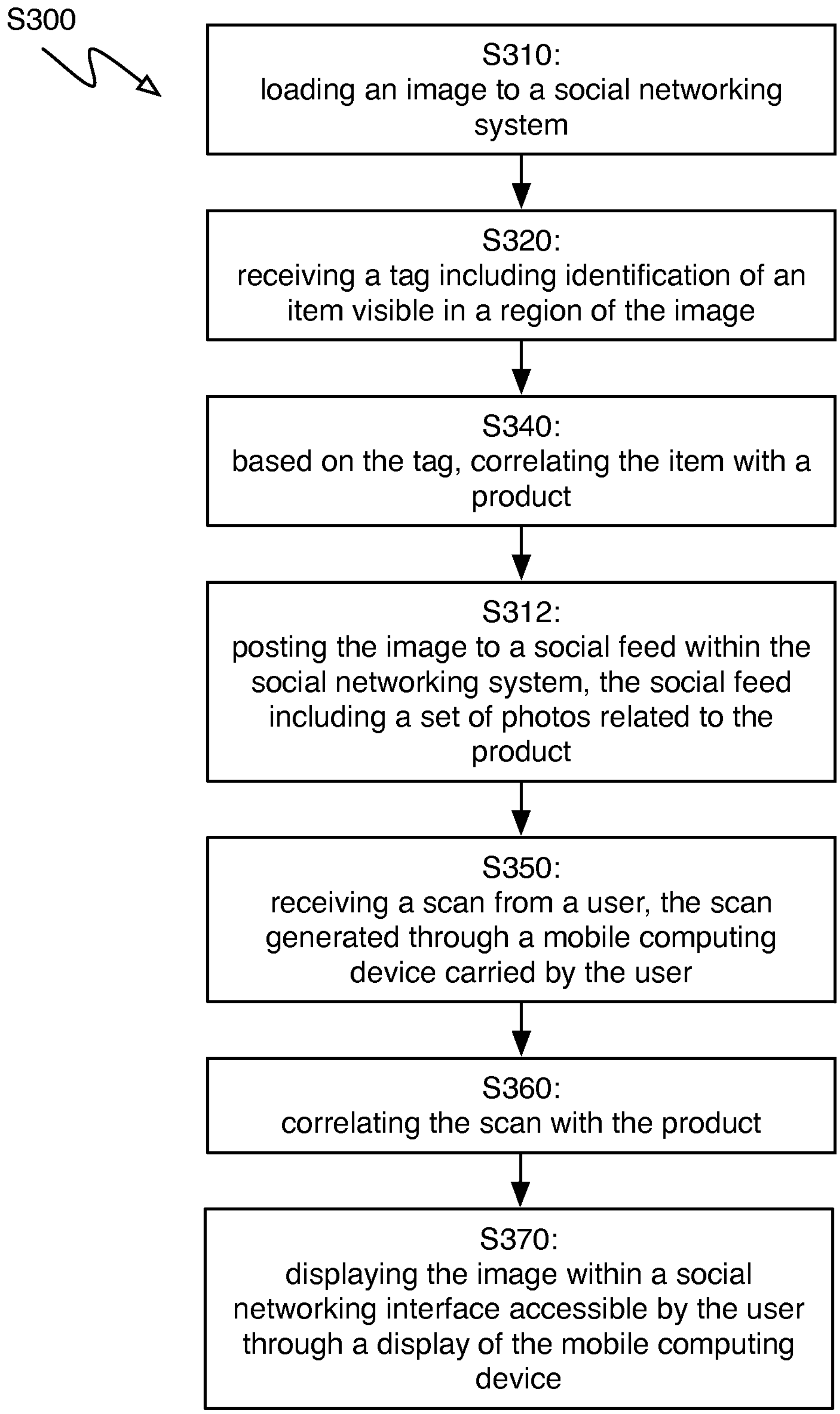
FIG. 7 is a flowchart representation of a third method of one embodiment.

As shown in FIG. 7, a third method S300 for displaying a product-related image to a user while shopping includes: loading an image to a social networking system in Block S310; receiving a tag including identification of an item visible in a region of the image in Block S320; based on the tag, correlating the item with a product in Block S340; posting the image to a social feed within the social networking system, the social feed including a set of photos related to the product in Block S312; receiving a scan from a user, the scan generated through a mobile computing device carried by the user in Block S350; correlating the scan with the product in Block S360; and displaying the image within a social networking interface accessible by the user through a display of the mobile computing device in Block S370.

Figure 15:
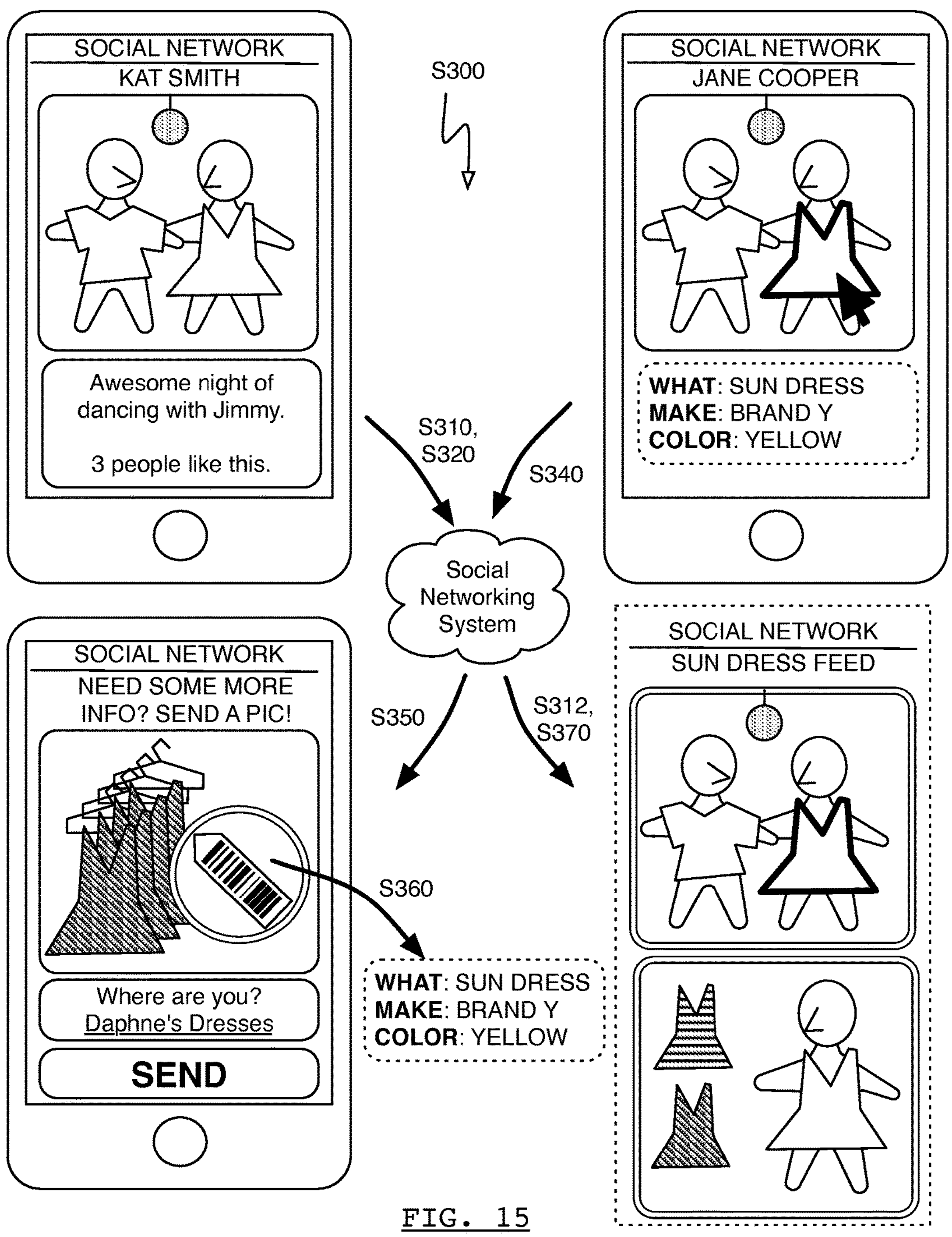
FIG. 15 is a flowchart representation of one variation of the third method.

Generally, third method S300 functions to aggregate product-related images into an image feed and to share this feed with a user when the user expresses an interest in, identifies, or provides information related to the product, as shown in FIG. 15. Third method S300 can therefore be applicable to an in-store user shopping experience to provide a user with product-related images in a timely fashion before the user completes a purchase, thereby enabling the user to see the product in use, see how the product fits, or see what other products, styles, or accessories function with or complement the product. For example, a user can enter a product SKU number, scan a barcode on the product, enter a product-related keyword search, select the product in a brand's social feed within the social networking system, take a photograph of the product, etc. through a user interface (e.g., a native application) on a mobile computing device (e.g., smartphone). Third method S300 can then identify the product based on information provided by the user, select an image feed related to the product, and direct the user to the image feed through the user interface on the mobile computing device. Third method S300 can additionally or alternatively aggregate images related to the product into the image feed based on information provided by the user and provide a link to the image feed.

As in first method S100 and second method S200, images in the feed can be professional (i.e., official) marketing or branding images, and/or the images can be amateur (i.e., unofficial) images, such as uploaded and tagged by one or more private users within the social networking system.

Third method S300 can therefore enable the user to view professional, amateur, or a combination of professional and amateur images related to a particular product, such as when shopping for the product, third method S300 thereby providing the user with augmented product-related information substantially in real time to enable the user to make a more informed purchase.

Like first method S100 described above, third method S300 can be implemented by a computer system, such as through an online photo-sharing platform or a social networking system that executes on the computer system and receives identification information of a product from a user, selects an image feed with images related to the product, and directs the user to the image feed. The computer system can be a cloud-based computer (e.g., Amazon EC2), a mainframe computer system, a grid-computer system, or any other suitable computer system. The computer system can further implement first method S100 and/or second method S200 in combination with method S300 to upload, tag, and aggregate product- and/or brand-related images as product or brand advertisements to entice user purchases through electronic or brick-and-mortar storefronts. For example, the computer system can upload photos and associated product tags over a distributed network, such as over the Internet, and one or more processors throughout the distributed network can implement one or more Blocks of first method S100, second method S200, and/or third method S300 to identify a common product in various images, aggregate the images into a social (e.g., image) feed, and push the social feed to a user when the user is shopping for the product, a similar product, a related product, or product by the same brand or in the same product line. The user can then access images in the social feed through a web browser or native application executing on a computing device, such as a laptop computer, a desktop computer, a tablet, a smartphone, a personal data assistant (PDA), a personal music player, etc. However, third method S300 can be implemented on or by any other one or more computer systems, services, networks, computing devices, etc.

Block S310 of third method S300 recites loading an image to a social networking system, Block S320 of third method S300 recites receiving a tag including identification of an item visible in a region of the image in Block S320, and Block S340 of third method S300 recites, based on the tag, correlating the item with a product in Block S340. Generally, Blocks S310, S320, and S340 implement techniques and methods similar to those of Blocks Silo and S210, Blocks S120 and S220, and Blocks S140B and S240A, respectively, to upload and tag images to the social networking system.

Block S312 of third method S300 recites posting the image to a social feed within the social networking system, the social feed including a set of photos related to the product. Once the image is uploaded and tagged in Blocks S310 through S340, Block S312 functions to aggregate images containing content related to a particular brand or product by posting images sharing similar brand and/or product tags to a social feed within the social networking system. In one implementation, Block S312 posts the image to a product feed within the social networking system, such as a feed hosted by a related brand or a merchant that sells the product, wherein the feed includes a combination of amateur images from private users and professional images from marketing campaigns. Block S312 can thus assemble a variety of images depicting different uses or use scenarios of the product. Block S312 can also adjust an order or rank of images in the social feed, such as based on image quality, lighting, size, users views, user likes, reposts, repins, number of tags or hotspots, etc. Block S312 can also arrange images in the feed based on predefined settings, such as two amateur images for every professional image or common colors amongst images. For example, Block S312 can arrange all bright images with orange, yellow, and light blue colors near the top of the social feed at the beginning of Spring, and Block S312 can arrange all darker images with browns, deep reds, and greens near the top of the social feed at the beginning of Fall.

Block S312 can further share the image across the social networking system, such as by posting the image to a private or semi-private feed of various users. Block S312 can also cooperate with Block S340 to correlate the product with a particular merchant and to post the image to a social feed of the particular merchant. Similarly, Block S312 can cooperate with Block S340 to correlate the product with a particular brand and to post the image to a social feed of the particular brand. However, Block S312 can function in any other way to post the image to a social feed that includes a set of photos related to the product.

Block S350 of third method S300 recites receiving a scan from a user, the scan generated through a mobile computing device carried by the user. Generally, Block S350 functions to collect product-related information from the user through a mobile computing device while the user is in a brick-and-mortar store, as shown in FIG. 15. Block S350 can collect product-related information in the form of a scan, photographic image, decrypted barcode or image information, user-entered information, user location data, etc. Block S350 can receive the scan wirelessly from the mobile computing device carried by the user, such as over a cellular network or via a wireless (e.g., Wi-Fi) Internet connection. By collecting product information, Block S350 can enable Block S360 to identify a product of interest to the user, thereby enabling Block S370 to select the social feed and/or images from the social feed that are relevant to the user.

In one example implementation, Block S350 receives the scan that includes a barcode scan of a physical tag on an item in the store, as shown in FIG. 15. In this implementation, the barcode scan can include a photographic image of a one-dimensional barcode, a two-dimensional barcode, a quick response (QR) code, or other suitable type of barcode. Block S350 can alternatively receive decrypted barcode information, such as from a shopping application executing on a user's mobile computing device and implementing machine vision techniques to analyze images of barcodes captured through the device's integrated camera. For example, Block S350 can receive a photograph of a tag captured through an optical sensor (e.g., camera) integrated into a mobile computing device (e.g., smartphone) carried by the user. Block S350 can then implement machine vision to identify a barcode in the image. Block S360 can subsequently decode the barcode through standard barcode decryption techniques and access a barcode database to identify the product attached to the physical tag. Alternatively, Block S350 can receive decrypted barcode information from a barcode scanning application executing on the mobile computing device, and Block S360 can implement the received decrypted barcode information to identify the product. Block S350 can similarly implement machine visual techniques to extract a stock keeping unit (SKU) number from an image of a physical product tag or any other text- or symbol-based product identifier from an image of a portion of the product or attached physical tag.

In another implementation, Block S350 receives a digital photograph of the product and implements machine vision and/or machine learning techniques to identify the product. For example, Block S350 can implement edge detection and template matching to identify the product in the photograph. Block S350 can also receive location information from the user's mobile computing device, such as a GPS location from a GPS sensor or a triangulated cellular position, to determine which store the user is currently occupying. Based on the store occupied by the user, Block S350 can identify the product in the image from a set of known products carried in the store. Additionally or alternatively, Block S350 can receive keywords from the user to guide identification of the product in the photo, such as a brand or product type (e.g., shirt, pant, blouse, shoe, motorcycle).

In other implementations, Block S350 receives textual product information entered by the user. In one example, Block S350 receives a textual description of the item, such as brand and product line or make and model number. In another example, Block S350 receives a SKU number, serial number, vehicle identification number (VIN), product code, or other number-based identifier of the brand or product. Block S350 can also receive data scanned from a near-field communication (NFC) chip, radio-frequency identification (RFID) chip, or other wireless chip embedded in or incorporated into the product or into a tag coupled to or arranged on the product. However, Block S350 can receive product-related information in any other form or format. Block S350 can also be implemented by the social networking system, by a remote server, by a native application executing on the user's mobile computing device, or by any other suitable entity.

Block S360 of third method S300 recites correlating the scan with the product. Generally, Block S360 functions to analyze product information received in Block S350 to determine the product of current interest to the user, as shown in FIG. 15. Therefore, Block S360 can function substantially in real time to associate the scan (e.g., barcode scan, photographic image of the product) with the product such that third method S300 can provide the user with access to images of the product while the user is shopping. Block S360 can also identify the product down to any suitable resolution. For example, Block S360 can identify the product as one item in a clothing line by a particular brand, a particular shirt style in a clothing line by a particular brand, or a shirt of a particular style in a clothing line by a particular brand and in a certain size and color. In another example, Block S360 can identify the product as a vehicle by a particular automotive manufacturer, a vehicle of a particular a make and model, a vehicle of a particular a make, model, year, and body style with particular options, or a specific vehicle with a specific VIN. As described above, Block S360 can access a product database to identify the product based on the product information sourced by Block S350. However, Block S350 can function in any other way to correlate the scan with the product.

Block S370 of third method S300 recites displaying the image within a social networking interface accessible by the user through a display of the mobile computing device. Generally, Block S370 functions to communicate additional product information, through product-related images, to the user substantially in real time, as shown in FIG. 15. Block S370 can thus provide relevant product-related information to the user when substantially relevant to the user (i.e., when the user is shopping for the product). Additionally or alternatively, Block S370 can target visual advertisements to the user through product-related images when the user is in a prime position to purchase the product (e.g., when the user is standing next to or holding the product). As described above, the social networking interface can be implemented through a native application executing on the mobile computing device (e.g., a native social networking application), through a web browser executing on the mobile computing device (e.g., web browser that accesses the social networking system), or through any other suitable application, system, service, or software.

In one implementation, Block S370 pushes the social feed, including the image correlated with the product in Block S340, to the user's mobile computing device (e.g., smartphone). For example, Block S370 can communicate electronic images in the social feed to a native social networking application executing on the mobile computing device or to a web browser executing on the mobile computing device. Block S370 can also communicate metadata of the images to the mobile computing device, such as brand or product tags, hotspots, links, origin, likes, or reposts. Block S370 can similarly communicate additional product information, such as a product description, where the product was made, product materials, a brand description, a brand mission statement, information or locations of local merchants that carry the product, similar products by other brands, local or online sale offers for the product, another local merchant offering the product for sale and a local or overage product price, other products that complement the product (e.g., shoes that pair well with a pair of pants), or a recipe that includes the product (e.g., a clam chowder recipe for the product that is fresh clams). The mobile computing device can then display the social feed including the image, image metadata, and/or product data on an integrated display or touchscreen. For example, the mobile computing device can display the image serially within a set of photos related to the product. In another implementation, Block S370 pushes a link, such as a hyperlink, to the user's mobile computing device, wherein the link directs the user to the image feed or other related product information.

In an illustrative example, Block S310 uploads an amateur photograph of a man sitting on a motorcycle and conversing with a woman. Blocks S320 and S340 cooperate to add various tags to the image and to correlate the image with various products, including a particular model of motorcycle by a particular manufacturer and a particular style blouse, worn by the woman, by a particular brand. Block S312 can add the image to a first image feed for the particular style and brand of blouse and to a second image feed for the particular motorcycle manufacturer. A first user who is a woman shopping in a local store can scan an RFID tag on a tag attached to the product that is the blouse. Block S350 can retrieve data from the RFID scan, and Block S360 can identify the style and brand of the blouse based on the RFID data. Block S370 can then communicate the first image feed, including images of the style and brand of blouse, to the first user's mobile computing device, thereby enabling the first user to see images of other women wearing the same or similar blouse, such as in both professional and amateur images. Similarly, a second user walking passed a biker bar can take a digital photograph of a brand badge on a gas tank of a parked motorcycle. Block S350 can retrieve the photograph, and Block S360 can implement template matching to identify the motorcycle manufacturer from the photograph. Block S370 can then communicate the second image feed, including images of motorcycles by the manufacturer and in various configurations, to the second user's mobile computing device, thereby enabling the second user to access additional information related to the motorcycle, to see various motorcycle configurations or options, and/or to learn about local shops that sell motorcycles by the manufacturer.

Additionally or alternatively, Block S370 can communicate information, images, or feeds pertaining to other products offered by the local store (e.g., merchant) occupied by (or near) the user. For example, the product image can be displayed, on the user's mobile computing device, in line with a set of photos of other products offered by the local store and identification information of the store. Block S370 can similarly communicate information, images, or feeds pertaining to other products offered by the brand and/or an advertisement for the product.

Block S370 can further rank and/or filter images in the feed communicated to the user's mobile computing device. For example, Block S370 can access the user's social networking profile within the social networking system to retrieve or determine user preferences, predict interests, or estimate images or advertisement types or styles most effective in effecting a user purchase. Additionally or alternatively, Block S370 can access user transaction history (e.g., user credit card history) to extract user buying preferences or trends. Block S370 can then arrange images in the image feed displayed to the user such that images most relevant to the user and/or most likely to evoke a positive reaction from the user are displayed first on the user's mobile computing device. For example, the user can scroll serially through ranked and/or filtered images displayed on the user's mobile computing device via the social networking interface. However, Block S370 can function in any other way to display the image to the user.

Figure 8:
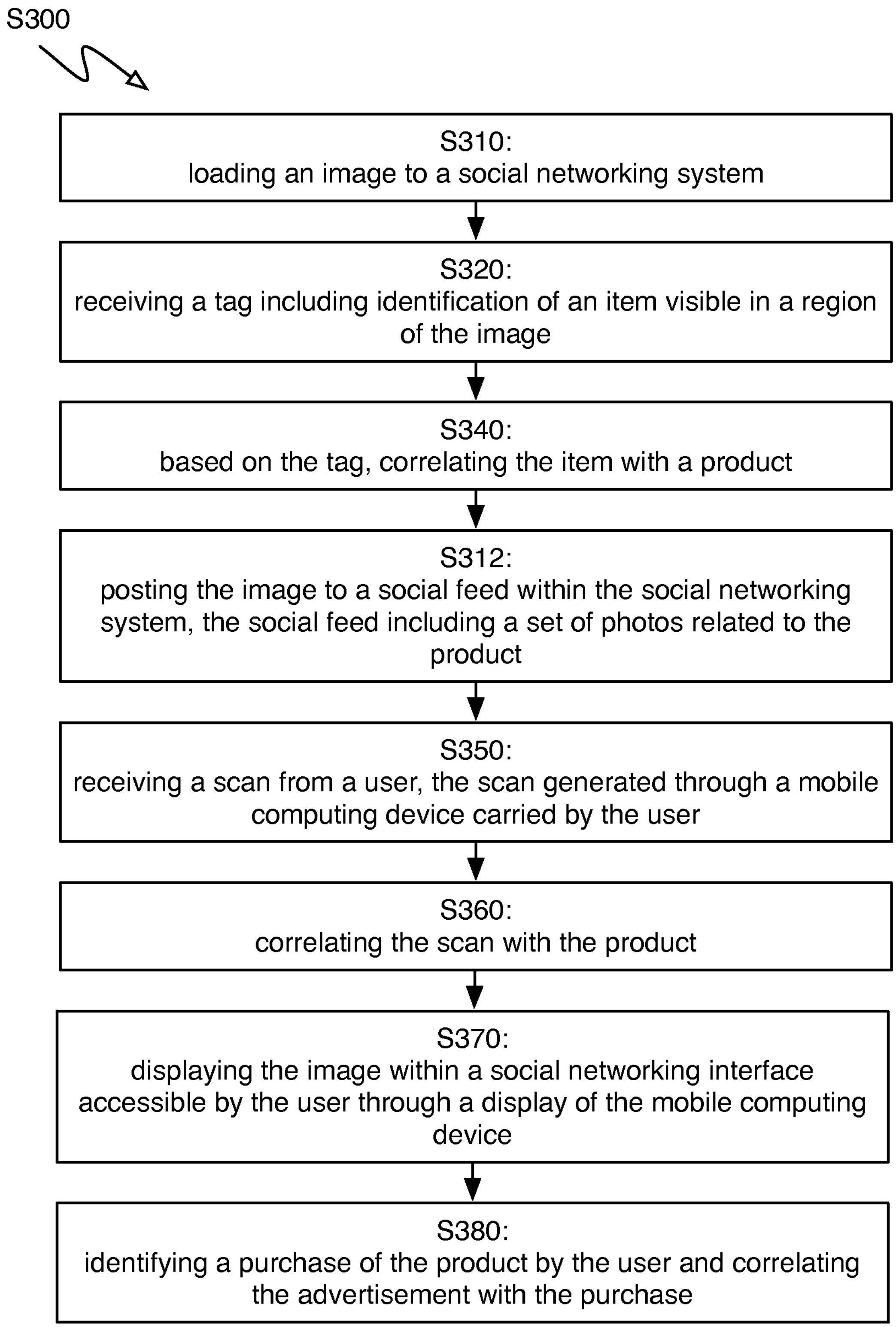
FIG. 8 is a flowchart representation of one variation of the third method.

As shown in FIG. 8, one variation of third method S300 further includes Block S380, which recites identifying a purchase of the product by the user and correlating the advertisement with the purchase. In one implementation, Block S380 accesses recent user transaction data (e.g., user credit card history) to determine that the user purchased the product and compares the product purchase with images of the product viewed by the user prior to (and around the time of) purchase. In another implementation, Block S380 accesses a recent post to the social networking system by the user, analyzes the post to determine that the user purchased the product, and correlates the product purchase with images of the product viewed by the user prior to (and around the time of) purchase. Generally, Block S380 can implement methods and techniques disclosed in U.S. Patent Application No. 61/849,813, which is incorporated in its entirety by reference, to determine a causal link between a user purchase of a product and user access to additional product images and information just prior to purchase. Block S380 can thus estimate an effectiveness of images in the social feed as advertisements for the product. However, Block S380 can function in any other way to identify a purchase of the product by the user and to correlate access to product-related images with a product purchase.

4. Social Networking System

Figure 9:
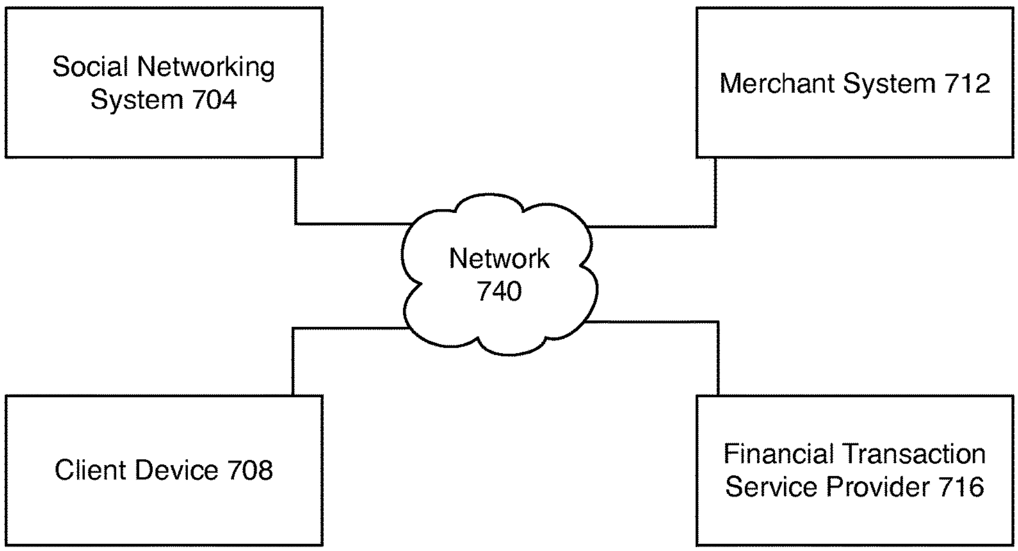
FIG. 9 is a block diagram of a system environment for a social networking system.

FIG. 9 is a Block diagram of a system environment for a social networking system 704. The system environment, shown in FIG. 9, includes a social networking system 704, a client device 708, a merchant system 712, a financial transaction service provider 114, and a network 740. Alternatively, the system environment can include different and/or additional components than those shown in FIG. 9.

The social networking system 704, further described below in conjunction with FIG. 10, includes one or more computing devices storing user profiles associated with users and/or other objects as well as connections between users and other users and/or objects. In use, users join the social networking system 704 and then add connections to other users or objects of the social networking system to which they desire to be connected. As further described below in conjunction with FIG. 10, users of the social networking system 704 can be individuals or entities such as businesses, organizations, universities, or manufacturers. The social networking system 704 allows its users to interact with each other as well as with other objects maintained by the social networking system 704. The social networking system 704 can therefore allow users to interact with third-party websites, such as the merchant system 712 and the financial transaction service provider 716. In one implementation, third-party developers can enable users of the social networking system to express interest in web pages hosted on websites external to the social networking system (i.e., third-party websites). These web pages can be represented as page objects in the social networking system as a result of embedding a widget, a social plug-in, programmable logic or code snippet into the web pages, such as an iFrame. Any concept that can be embodied in a web page can become a node in the social graph on the social networking system in this manner. As a result, users can interact with many objects external to the social networking system. Each of the interactions with an object can be recorded by the social networking system as an edge. These interactions can be used, for example, to identify a gift-appropriate event of the recipient. Enabling third-party developers to define object types and action types is further described in a related application, "Structured Objects and Actions on a Social Networking System," U.S. application Ser. No. 13/239,340 filed on Sep. 21, 2011, which is hereby incorporated by reference. In one embodiment, the interaction can be a comment associated with a content object hosted by a third party system, as further described in a related application, "Comment Plug-In for Third Party System," U.S. application Ser. No. 12/969,368 filed on Dec. 15, 2010. As such, the electronic communication may be entered into a comment field of an embedded widget, a social plug-in, programmable logic or code snippet into a third party web page, such as an iFrame.

Based on stored data about users, objects and connections between users and/or objects, the social networking system 704 generates and maintains a "social graph" including a plurality of nodes interconnected by a plurality of edges. Each node in the social graph represents an object or user that can act on another node and/or that can be acted on by another node. An edge between two nodes in the social graph represents a particular kind of connection between the two nodes, which can result from an action that was performed by one of the nodes on the other node. For example, when a user identifies an additional user as a friend or confirms a friend request from another user, first method S100 can generate an edge in the social graph generated connecting a node representing the first user and an additional node representing the additional user. The generated edge has a connection type indicating that the users are friends. As various nodes interact with each other, the social networking system 704 modifies edges connecting the various nodes to reflect the interactions.

A client device 708 is a computing device capable of receiving user input as well as transmitting and/or receiving data via the network 740. In one implementation, the client device 708 is a conventional computer system, such as a desktop or laptop computer. In another implementation, the client device 708 can be a device having computer functionality, such as a personal digital assistant (PDA), mobile telephone, smart-phone or similar device. The client device 708 is configured to communicate with the social networking system 704, the merchant system 712 and/or the financial transaction service provider 716 via the network 740. In one implementation, the client device 708 executes an application allowing a user of the client device 708 to interact with the social networking system 704. For example, the client device 708 executes a browser application to enable interaction between the client device 708 and the social networking system 704 via the network 740. In another implementation, a client device 708 interacts with the social networking system 704 through an application programming interface (API) that runs on the native operating system of the client device 708, such as iOS or ANDROID operating system.

The client devices 708 are configured to communicate via the network 740, which can include any combination of local area and/or wide area networks, using both wired and wireless communication systems. In one implementation, the network 740 uses standard communications technologies and/or protocols. Thus, the network 740 can include links using technologies such as Ethernet, 802.11, worldwide interoperability for microwave access (WiMAX), 3G, 4G, CDMA, digital subscriber line (DSL), etc. Similarly, the networking protocols used on the network 740 can include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 740 can be represented using technologies and/or formats including hypertext markup language (HTML) or extensible markup language (XML). In addition, all or some of the links can be encrypted using conventional encryption technologies such as secure sockets layer (SSL), transport layer security (TLS), and Internet Protocol security (IPsec).

The merchant system 712 includes one or more servers providing content associated with a merchant. For example, the merchant system 712 provides web pages describing products and/or services sold by one or more vendors. The merchant system 712 can also perform other functions to allow the merchant to provide products or services in exchange for compensation. Examples of functions provided by the merchant system 712 include maintaining accounts for purchasers, tracking inventory levels, modifying pricing of products or services, obtaining compensation for products or services from the financial transaction service provider 716 and/or other suitable actions. The merchant system 712 communicates with the social networking system 704, and/or the financial transaction service provider 716 via the network 740.

The financial transaction service provider 716 processes virtual currency transactions between a merchant and a customer, such as credit, debit, private-label, gift, payroll, a prepaid card, and/or other virtual currency, credit, or debit transaction. The financial transaction service provider 716 therefore directs a fund from a financial account of a consumer to a financial account of a merchant in response to a consumer purchase and can further direct a fund from a merchant to a consumer, such as in response to a return or exchange. The financial transaction service provider 716 can further provide fraud protection and authentication solutions, electronic check acceptance services, and/or Internet commerce and mobile payment solutions.

Figure 10:
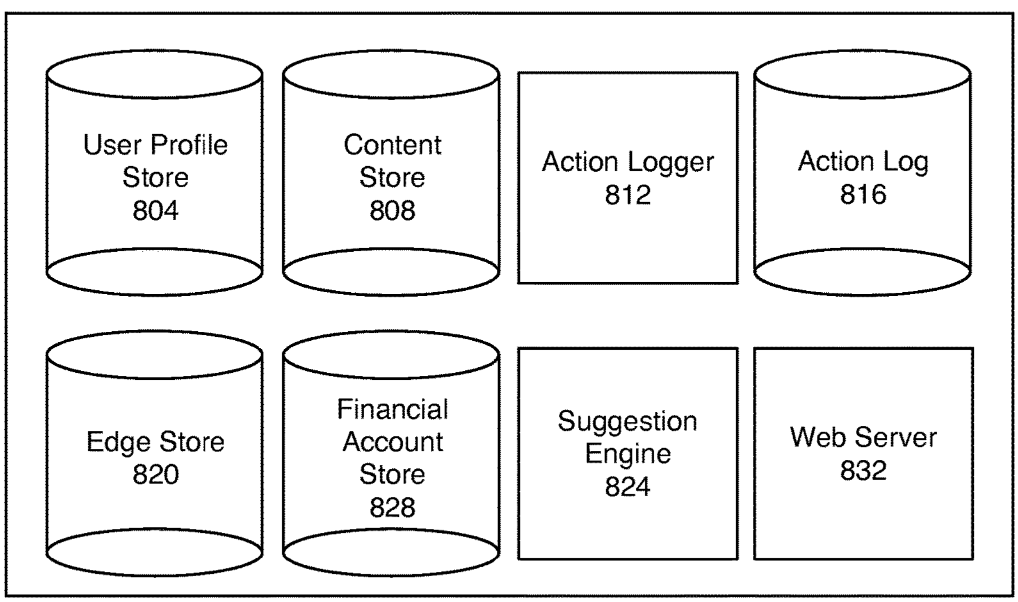
FIG. 10 is a block diagram of a system architecture of the social networking system.

FIG. 10 is a Block diagram of a system architecture of the social networking system 704. The social networking system 704 shown in FIG. 10 includes a user profile store 804, a content store 808, an edge store 820, an action logger 812, an action log 816, a suggestion engine 824, a financial account store 828 and a web server 832. Alternatively, the social networking system 704 can include additional, fewer, or different modules for various applications. Conventional components such as network interfaces, security mechanisms, load balancers, failover servers, management and network operations consoles, and the like are not shown so as to not obscure the details of the system architecture.

Each user of the social networking system 704 is associated with a user profile, which is stored in the user profile store 804. A user profile includes declarative information about the user that was explicitly shared by the user, and can also include profile information inferred by the social networking system 704. In one implementation, a user profile includes multiple data fields, each data field describing one or more attributes of the corresponding user of the social networking system 704. The user profile information stored in user profile store 804 describes the users of the social networking system 704, including biographic, demographic, and other types of descriptive information, such as work experience, educational history, gender, hobbies or preferences, location and the like. A user profile can also store other information provided by the user, for example, images or videos. Images of users can be tagged with identification information of users of the social networking system 704 displayed in an image. A user profile in the user profile store 804 can also maintain references to actions by the corresponding user performed on content items in the content store 808 and stored in the edge store 820.

A user profile can be associated with one or more financial accounts, which enables tracking of prepaid gifts and redemption of those gifts when using an associated financial account. A user can specify one or more privacy settings, which can be stored in the user profile. The privacy settings can specify the content and quantity of (personal) user data that can be tracked, shared, and/or accessed by the social networking system 704. In one implementation, information from the financial account is stored in the user profile store 804. Alternatively, information can be stored in the financial account store 828.

The content store 808 stores content items associated with a user profile, such as images, videos or audio files. Content items from the content store 808 can be displayed when a user profile is viewed or when other content associated with the user profile is viewed. For example, displayed content items can show images or video associated with a user profile or show text describing a user's status. Additionally, other content items can facilitate user engagement by encouraging a user to expand his connections to other users, to invite new users to the system or to increase interaction with the social network system by displaying content related to users, objects, activities, or functionalities of the social networking system 704. Examples of social networking content items include suggested connections or suggestions to perform other actions, media provided to, or maintained by, the social networking system 704 (e.g., pictures or videos), status messages or links posted by users to the social networking system, events, groups, pages (e.g., representing an organization or commercial entity), and any other content provided by, or accessible via, the social networking system.

The content store 808 also includes one or more pages associated with entities having user profiles in the user profile store 804. An entity is a non-individual user of the social networking system 704, such as a business, a vendor, an organization or a university. A page includes content associated with an entity and instructions for presenting the content to a social networking system user. For example, a page identifies content associated with the entity's user profile as well as information describing how to present the content to users viewing the brand page. Merchants associated with merchant systems 712, further described above in conjunction with FIG. 9, can be associated with pages in the content store 808, allowing social networking system users to more easily interact with the merchant via the social networking system 704. A merchant identifier is associated with a vendor's page, allowing the social networking system 704 to identify the merchant and/or to retrieve additional information about the merchant from the user profile store 804, the action log 816 or from any other suitable source using the vendor identifier.

The action logger 812 receives communications about user actions on and/or off the social networking system 704, populating the action log 816 with information about user actions. Such actions can include, for example, adding a connection to another user, sending a message to another user, uploading an image, reading a message from another user, viewing content associated with another user, attending an event posted by another user, among others. Moreover, the actions can relate to a merchant. In one example, a user can "like" an object associated with the merchant, for example, by explicitly making that indication on the merchant's page in the social network. In another example, a user can comment on a merchant's page within the social network, share a story from the merchant's page, tag a photo associated with the merchant or a product or service provided by the merchant, become a fan of the merchant, check-in to a brick-and-mortar store of the merchant, or subscribe or follow the merchant. As described in U.S. patent application Ser. No. 13/239,340, which is incorporated herein in its entirety by this reference, the edge store 820 can correlate any one or more such user actions with an interest in the merchant or a product of service from the merchant, which can be useful in selection of an appropriate advertisement for the user.

The action log 816 can be used by the social networking system 704 to track user actions on the social networking system 704, as well as external websites that communicate information to the social networking system 704. Users can interact with various objects on the social networking system 704, including commenting on posts, sharing links, and checking-in to physical locations via a mobile device, accessing content items in a sequence or other interactions. Information describing these actions can be stored in the action log 816, and the extent and content of such interactions can be correlated with an affinity for the objects. Additional examples of interactions with objects on the social networking system 704 included in the action log 816 include commenting on a photo album, communications between users, becoming a fan of a musician, adding an event to a calendar, joining a group, becoming a fan of a brand page, creating an event, authorizing an application, using an application and engaging in a transaction. Additionally, the action log 816 records a user's interactions with advertisements on the social networking system 704 as well as other applications operating on the social networking system 704. Data from the action log 816 is used to infer interests or preferences of the user, augmenting the interests included in the user profile and allowing a more complete understanding of user preferences.

The action log 816 can also store user actions on external websites and/or determined from a financial account associated with the user. For example, an e-commerce website that primarily sells sporting equipment at bargain prices can recognize a user of a social networking system 704 through social plug-ins that enable the e-commerce website to identify the user of the social networking system 704. Because users of the social networking system 704 are uniquely identifiable, e-commerce websites, such as this sporting equipment retailer, can use the information about these users as they visit their websites. The action log 816 records data about these users, including webpage viewing histories, advertisements that were engaged, purchases made, and other patterns from shopping and buying, such as in accordance with privacy settings of the user. Actions identified by the action logger 812 from the transaction history of a financial account associated with the user allow the action log 816 to record further information about additional types of user actions.

In one embodiment, an edge store 820 stores information describing connections between users and other objects on the social networking system 704 as edge objects. Some edges can be defined by users, allowing users to specify their relationships with other users. For example, users can generate edges with other users that parallel the users' real-life relationships, such as friends, co-workers, partners, etc. Other edges are generated when users interact with objects in the social networking system 704, such as expressing interest in a page on the social networking system, sharing a link with other users of the social networking system, and commenting on posts made by other users of the social networking system. The edge store 820 stores edge objects that include information about the edge, such as affinity scores for objects, interests, and other users. For example, an affinity score between a user and a merchant can be stored. Affinity scores can be computed by the social networking system 704 over time to approximate a user's affinity for an object, interest, and other users in the social networking system 704 based on the actions performed by the user. Multiple interactions between a user and a specific object can be stored in one edge object in the edge store 820, in one embodiment. Connections between users can be stored in the user profile store 804, or the user profile store 804 can access the edge store 820 to determine connections between users.

In one implementation, the financial account store 828 includes financial account identifiers associated with user profiles and an association or mapping between a financial account and its corresponding user profile. A user can include additional information about the financial account in the financial account store, such as a description of the financial account and can also include authentication information for accessing the account such as names, passwords or other security credentials. In implementation in which information about user financial accounts are stored in the financial account store 828, the social networking system 704 can apply additional security measures (encryption, etc.) to the financial account store 828 to reduce the risk of unauthorized access to financial account information. Alternatively, financial account information can be included in the user profile store 804 as data in a user's user profile. One or more privacy settings can be applied to the financial account information to limit its accessibility to objects in the social networking system 704.

The suggestion engine 824 accesses data in the user profile store 804, in the action log 816, and/or the content store 808 either individually or in combination and identifies one or more candidate products associated with vendors in which a user is likely to have an interest. Generally, the suggestion engine can analyze the action log 816, identify user actions related to one or more merchants, products, or services, calculate the user's affinity for one or more merchants, products, or services, and select a suitable advertisement for the user based on the user's affinity. The suggestion engine 824 can also collect offers for products from local merchants, wherein the products can be collected or fulfilled through a physical retail location and/or through e-commerce. The suggestion engine 824 can further calculate an affinity between a user who is a (potential) recipient and a second user who is a (potential) sender, such as based on interactions between the users including messages, posts, and/or other communications between the users within the social networking system, and select the second user as the sender based on the affinity between the users. The suggestion engine 824 can subsequently recommend the selected gift to the sender and facilitate sender purchase of the product for the recipient.

Actions between the user and pages maintained by the social networking system stored in the action log 816 can be used by the suggestion engine 824 to select candidate products. The suggestion engine 824 can analyze actions involving the user and various pages in the content store 808 as well as connections between the user and various pages in the edge store 820 to select candidate products. For example, the suggestion engine 824 selects candidate products based on the frequency of actions between the user and a page, the number of interactions between the user and the page, the type of connection between the user and a page, staleness of the interactions, a type of action between the user and a page or any other suitable criteria.

The web server 832 links the social networking system 704 via the network 740 to the client device 708, to the financial transaction service provider 716 and/or to the merchant system 712. The web server 832 serves web pages, as well as other web-related content, such as Java, Flash, XML and so forth. The web server 832 can provide the functionality of receiving and routing communications between the social networking system 704 and the client device 708, for example, instant messages, queued messages (e.g., email), text and SMS (short message service) messages, or messages sent using any other suitable messaging technique. A user can send a request to the web server 832 to upload information, for example, images or videos that are stored in the content store 808. Additionally, the web server 832 can provide application programming interface (API) functionality to send data directly to native client device operating systems, such as iOS, ANDROID, webOS, or RIM operating system. The web server 832 also provides API functionality for exchanging data, such as financial account information, between the social networking system 704 and the financial transaction service provider 716.

The image can be one form of user-generated "content" accessible through the social networking system to enhance a user experience. However, "content" can include any type of media content, such as a status update, textual message, location information, photo, video, advertisement, or web link. Content "items" can define pieces of content that are represented as objects within the social networking system. Thus a user of the social networking system may be encouraged to communicate with another user by "posting" content items of one or more types through various communication channels within the social networking system, which can increase length and/or frequency of interaction between the users through social networking system. For example, a communication channel can be a "stream" through which a series of content items posted, uploaded, or otherwise provided to the social networking system are shared with one or more users. In this example, the stream can also be updated as one or more users add content items to the stream. Additionally or alternatively, the a communication channel can be as disclosed in U.S. patent application Ser. No. 12/253,149, filed on 16 Oct. 2008, which is incorporated herein in its entirety by this reference.

Content sharing between users can also be limited. For example, a user can post a video from a company presentation to the social networking system, wherein the video is not appropriate for sharing across all of the user's connections (e.g., connections that include employees of competing companies). In this example, the user can thus desire to confine accessibility to the video to a select audience. Therefore, the social networking system can enable a user to modify how content items are shared throughout the social networking system. For example, the social networking system can enable the user to designate a privacy setting for a content item, wherein the privacy setting defines a set of users who have access to the content item posted to a communication channel. The privacy setting can therefore enables the user to hide specific content items from certain connections or to target specific content items to a particular audience, thereby focusing content delivery to an individual or group of connections selected by the user. A connection not identified by a privacy setting can thus be blocked from viewing or otherwise accessing the content item. Privacy settings are further described in U.S. patent application Ser. No. 12/154,886, filed on 27 May 2008, which is incorporated herein in its entirety by this reference.

The social networking system can also enable the user to specify privacy setting at various levels of granularity. For example, the user can specifically exclude certain connections from viewing a content item. Furthermore, once the user enters a custom privacy setting, the social networking system can store the custom privacy setting for application to future posts. The privacy setting can also be modified for each content item the user uploads at the time of upload, thereby enabling the user flexibility in controlling access to the content item. Alternatively, the social networking system can enable the user to select a default privacy setting for uploaded content items. The social networking system can additionally or alternatively enable the user to edit a privacy setting for a content item after the content item was posted. The user can thus confine accessibility to the content item to a selected audience retroactively. However, the social networking system can implement privacy settings through methods S100, S200, S300 in any other suitable way.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, or any suitable combination thereof. Other systems and methods of the embodiments can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, though any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:

posting an image uploaded by a first user to a first social feed for display within a first social networking interface of a social networking system comprising one or more servers;

receiving, by the one or more servers from the first user via the first social networking interface, a tag comprising identification of an item visible in a particular region of the image;

associating, by the one or more servers, the tag with the particular region of the image;

based on the tag, correlating, by the one or more servers, the item with a particular brand;

in response to the received tag:

reposting, by the one or more servers, the image from the first social feed of the first user to a second social feed of the particular brand within the social networking system; and rearranging a plurality of images within the second social feed for display within a second social networking interface for a second user based on an additional of the image to the second social feed and characteristics of the image and the plurality of images; and in response to interaction by the second user with the image in the second social feed of the particular brand, directing, by the one or more servers, the second user to brand content specified by the particular brand.

2. The method of claim 1, wherein directing the second user to brand content comprises directing the second user to a curated brand page within the social networking system.

3. The method of claim 2, wherein posting the image uploaded by the first user to the first social feed of the first user of the social networking system comprises receiving a photographic image from the first user, and wherein directing the second user to the curated brand page comprises directing the second user to the curated brand page that comprises photos loaded to the social networking system and tagged, by the particular brand, with products offered by the particular brand.

4. The method of claim 1, further comprising:

predicting an interest of the second user based on browsing history of the second user within the social networking system and user information stored in the social networking system, and wherein rearranging the plurality of images within the second social feed for display within the second social networking interface further comprises rearranging the plurality of images in the second social feed of the particular brand in an order according to the predicted interest of the second user, wherein the images of most interest to the second user appear at the top of the second social feed of the particular brand and the images of least interest to the second user appear at the bottom of the second social feed of the particular brand.

5. The method of claim 1, further comprising reposting the image to a social feed of the second user according to a subscription of the second user to the particular brand within the social networking system.

6. The method of claim 1, wherein receiving the tag comprises receiving the tag identifying a clothing item in the region of the image, wherein correlating the item with the particular brand comprises identifying a designer of the clothing item.

7. The method of claim 1, wherein directing the second user to brand content comprises directing the user to one of a website associated with the particular brand, a blog associated with the particular brand, a native application associated with the particular brand, and a curated brand page within the social networking system.

8. The method of claim 1, wherein posting the image uploaded by the first user to the first social feed of the first user of the social networking system comprises receiving the image from the first user, and further comprising rewarding the first user in response to receiving the tag.

9. The method of claim 1, wherein rearranging the plurality of images within the second social feed comprises rearranging the plurality of images based on one or more of an origin, quality, and identified product within the image and one or more of origins, qualities, and identified products within the plurality of images.

10. A method comprising:

posting an image uploaded by a first user to a first social feed for display within a first social networking interface of a social networking system comprising one or more servers;

receiving, by the one or more servers from the first user via the first social networking interface, a tag comprising identification of an item visible in a particular region of the image;

associating, by the one or more servers, the tag with the particular region of the image;

based on the tag, correlating, by the one or more servers, the item with a product;

in response to the received tag, reposting, by the one or more servers, the image from the first social feed of the first user to a second social feed for display within a second social networking interface for a second user of the social networking system, the second social feed comprising photos related to the product; and in response to interaction with the image in the second social feed by the second user, generating, by the one or more servers, an enlarged version of the image and corresponding menu options within the second social networking interface, the enlarged version of the image comprising a visual cue corresponding to the particular region of the image.

11. The method of claim 10, further comprising:

correlating the product with a particular merchant;

reposting the image to a social feed of the particular merchant within the social networking system; and directing the second user to an electronic storefront of the particular merchant.

12. The method of claim 10, further comprising sourcing a link to an electronic storefront and displaying an additional visual cue of the link contiguous with the image in the second social feed.

13. The method of claim 10, further comprising:

predicting an interest of the second user based on browsing history of the second user within the social networking system and user information stored in the social networking system, and wherein posting the image from the first social feed of the first user to the second social feed within the social networking system further comprises arranging the photos related to the product in the second social feed in an order according to the predicted interest of the second user, wherein the photos of most interest to the second user appear at the top of the second social feed and the photos of least interest to the second user appear at the bottom of the second social feed.

14. The method of claim 10, further comprising predicting an interest of the second user based on browsing history of the second user within the social networking system and reposting the image to a personal social feed of the second user according to the predicted interest that is related to the product.

15. The method of claim 12, wherein the additional visual cue comprises enlarging or animating the product within the image.

16. The method of claim 10, wherein the corresponding menu options comprise one or more of a sharing option to share the image within the social networking system or a sending option to send the image to another user of the social networking system.

17. The method of claim 10, wherein the corresponding menu options comprise include a selectable link to information concerning the product.

18. The method of claim 10, wherein posting the image uploaded by the first user to the first social feed of the first user of the social networking system comprises posting the image to a personal feed of the first user within the social networking system.

19. The method of claim 11, wherein directing the second user to the electronic storefront comprises:

receiving location data from a mobile computing device associated with the second user;

identifying a brick-and-mortar retail store proximal the location of the mobile computing device, the retail store associated with the electronic storefront; and displaying a location of the retail store and availability of the product at the retail store through a social networking application executing on the mobile computing device.

20. The method of claim 11, wherein directing the second user to the electronic storefront comprises directing the second user to a product page of a particular merchant within the social networking system, the product page comprising a curated set of photos of products offered by the particular merchant.

* * * * *